United States Patent [19]
Platz et al.

[11] Patent Number: 6,004,508
[45] Date of Patent: Dec. 21, 1999

[54] METHOD AND APPARATUS FOR SUPER CRITICAL TREATMENT OF LIQUIDS

[75] Inventors: Gerald M. Platz, Conroe, Tex.; N. Wayne Walkup, Baxter Springs, Kans.; Howard L. Grimmett, The Woodlands, Tex.

[73] Assignee: The Coca-Cola Company, Atlanta, Ga.

[21] Appl. No.: 08/904,603

[22] Filed: Aug. 1, 1997

[51] Int. Cl.⁶ ............................................. A61L 2/08
[52] U.S. Cl. ............................. 422/26; 99/453; 99/461; 422/39; 422/295; 426/521
[58] Field of Search .............................. 422/26, 39, 295; 426/521; 99/453, 461

[56] References Cited

U.S. PATENT DOCUMENTS

| | | | |
|---|---|---|---|
| 4,583,453 | 4/1986 | Torterotot | 99/455 |
| 4,684,531 | 8/1987 | Torterotot | 429/399 |
| 4,717,575 | 1/1988 | Larroche . | |
| 4,999,471 | 3/1991 | Guarneri et al. . | |
| 5,165,325 | 11/1992 | Akatsu | 99/275 |
| 5,213,029 | 5/1993 | Yutaka . | |
| 5,228,394 | 7/1993 | Kanda et al. . | |
| 5,316,745 | 5/1994 | Ting et al. | 422/295 |
| 5,328,703 | 7/1994 | Nakagawa et al. . | |
| 5,344,609 | 9/1994 | Long | 422/26 |
| 5,370,043 | 12/1994 | Traff et al. . | |
| 5,422,130 | 6/1995 | Fox et al. | 426/234 |
| 5,432,265 | 7/1995 | Tomasula . | |
| 5,439,703 | 8/1995 | Kanda et al. . | |
| 5,622,678 | 4/1997 | Hiltawsky et al. . | |
| 5,658,610 | 8/1997 | Bergman et al. . | |
| 5,701,808 | 12/1997 | Schuman et al. | 99/453 |

FOREIGN PATENT DOCUMENTS

| | | |
|---|---|---|
| 395 884 B1 | 3/1990 | European Pat. Off. . |
| 438 083 B1 | 1/1991 | European Pat. Off. . |
| 727 227 A1 | 2/1996 | European Pat. Off. . |
| 62-285774 | 12/1987 | Japan . |
| 62-289188 | 12/1987 | Japan . |
| 133006 | 11/1989 | Japan . |
| 12051A | 6/1991 | Japan . |
| 4-154142 | 5/1992 | Japan . |
| 5-252880 | 10/1993 | Japan . |
| 5-292928 | 11/1993 | Japan . |
| 5-308936 | 11/1993 | Japan . |
| 5328950 | 12/1993 | Japan . |
| 10084885 | 4/1998 | Japan . |
| WO 94/21145 | 3/1994 | WIPO . |
| WO 94/28745 | 6/1994 | WIPO . |

OTHER PUBLICATIONS

"High Pressure Processing: A Technology of the Future", Food Manufacture (Jun. 1997, pp. 21,22,26).

*Primary Examiner*—Krisanne Thornton
*Attorney, Agent, or Firm*—Thomas C. McThenia Jr.; Dennis W. Braswell

[57] ABSTRACT

A process for sterilization of a liquid in a continuous system including a series of steps. First the liquid is continuously pumped into a pressurized system. Second, the pressure on the liquid is increased in a first pressurization stage. Next, the liquid is increased in pressure in a second pressurization stage. Fourth, the liquid is held at an elevated pressure for a predetermined period of time to kill off microorganisms within the liquid. The liquid is then rapidly depressurized to fracture microorganisms within the liquid. The apparatus for producing this process includes a continuous liquid treatment system with a pump, a first stage intensifier, a surge drum, a second stage intensifier, a pressure receiver and a pressure reducer. A particulate treatment system may also be included which includes a pressure receiver, an intensifier, and a recoverer for blending a particulate component with the liquid component.

18 Claims, 15 Drawing Sheets

METHOD AND APPARATUS FOR SUPER CRITICAL TREATMENT OF LIQUIDS

FIELD OF THE INVENTION

The present invention relates to a super critical treatment process for the sterilization or deactivation of microorganisms in liquids, such as liquid foods and beverages.

BACKGROUND OF THE INVENTION

Many liquids, such as commercial processed foods, including, but not limited to, juices, beverages, soups and stews, contain microorganisms that continue to multiply after processing, thereby reducing the safe shelf life of the foods. It is has been known that exposure of microorganisms to very high pressures (e.g. up to 100 kpsi) will reduce the population of various species of microorganisms during batch processing. Furthermore, the high pressure treatment of liquid foods, while deactivating microorganisms, has essentially no negative effect on the taste and appearance of the liquid.

The prior art generally discloses complicated batch processes and apparatus for the deactivation of microorganisms in a liquid. Unfortunately, batch processes can be expensive and inefficient.

SUMMARY OF THE INVENTION

In accordance with the teachings of the present invention, a process and an apparatus for the sterilization of a liquid are provided which substantially eliminate or reduce disadvantages and problems associated with prior art devices and techniques. In particular, the process for sterilizing a liquid (which may be a liquid component alone or a liquid component and a particulate component) includes increasing the pressure on the liquid, and rapidly reducing the pressure on the liquid component while maintaining the liquid within an acceptable temperature range.

To produce this process, there is provided an apparatus that includes a pump for introducing a liquid into a pressurized system. The pump is coupled with a first stage intensifier for increasing the pressure of the liquid. A second stage intensifier is coupled to the first stage intensifier to further increase the pressure on the liquid. Although the two-stage increase is preferred, a single stage could also be used. A pressure receiver is connected to the second stage intensifier, the pressure receiver for maintaining the pressure on the liquid for a predetermined period of time. Finally, a pressure reducer is attached to the pressure receiver wherein the pressure reducer receives the liquid and reduces the pressure on the liquid to atmospheric pressure. In addition, a particulate component treatment apparatus can be provided, which includes a receiver, an intensifier, and a mixer, for mixing the particulate component with the liquid component, if particulate components are provided. The particulate component treatment apparatus can also be used on the liquid components, and thus a mixer may not be needed in such cases.

One important technical advantage of the present invention is the fact that it provides a continuous system for sterilizing a liquid, thereby reducing the strain on the apparatus from the repeated cycling of pressurization in the system, and increasing system efficiency. Another important technical advantage of the present invention is that it can be repaired without interrupting the continuous process for sterilization of liquid within the system.

DETAILED DESCRIPTION OF THE INVENTION

Throughout the following discussion, specific pressures, temperatures, times, and other parameters, and specific ranges for such parameters, are provided. It should be understood that these are exemplary only, and that others can be used without departing from the intended scope herein.

The present invention relates to a process and an apparatus for the process of treating liquid foods and beverages, including, but not limited to, juices, fruit juices, orange juice, grapefruit juice, tangerine juice, apple juice, stews, and beef stew. The liquid, and, if any, particulate components, in this system is pressurized and depressurized to increase the shelf life of the liquid once packaged. In the preferred embodiment, the pressure on the liquid (and particulate components, if any) in the system is increased to about 60,000 psig and held for a sufficient period of time (e.g., about 100 to about 500 seconds) to effect the desired kill level of microbial population within the liquid. After the liquid food has been pressurized, it is rapidly depressurized to cause the remaining microbes within the liquid food to fracture. To maintain the integrity and taste of the liquid, the temperature for the liquid food in the process and the apparatus is maintained within a desired temperature range, preferably between about 35 degrees Fahrenheit and about 85 degrees Fahrenheit.

Figure 1:
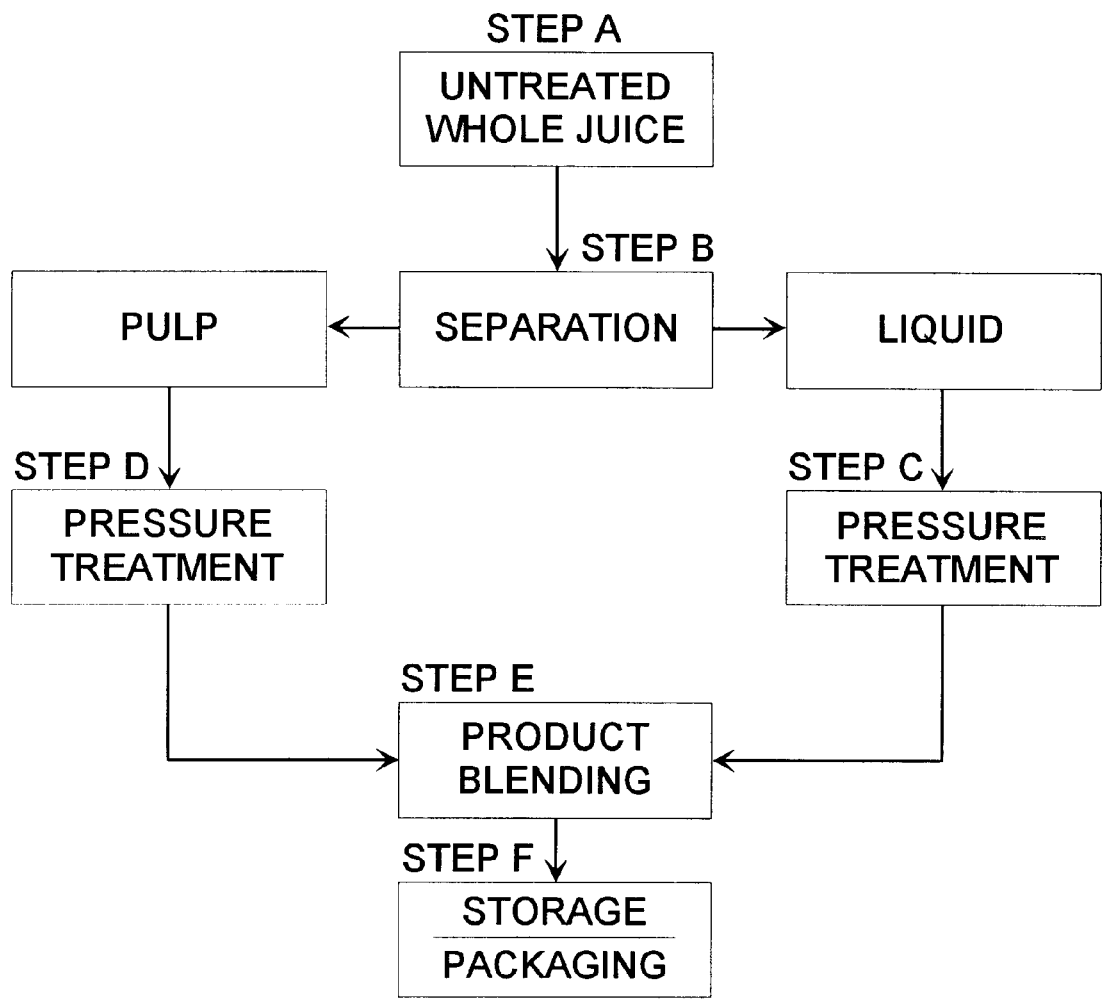
FIG. 1 is a block flow diagram of the total deactivation process.

Turning now to FIG. 1, a flow chart is provided to illustrate a process according to the present invention. The illustrated process involves a liquid and a particulate component, it being understood that the present invention also applies in cases where there is only a liquid component.

As illustrated in FIG. 1, the process begins with step A wherein untreated liquid food of approximately 10% particulate component is introduced into the pressurized system. The liquid food is then separated into a liquid component and a particulate component in step B via a separator. The liquid and particulate components are each sent for separate pressure treatments in steps C and D respectively. Once the liquid and particulate matter have been pressure treated, the two components are blended in step E. Finally, this bulk product is packaged for storing in step F.

Figure 2:
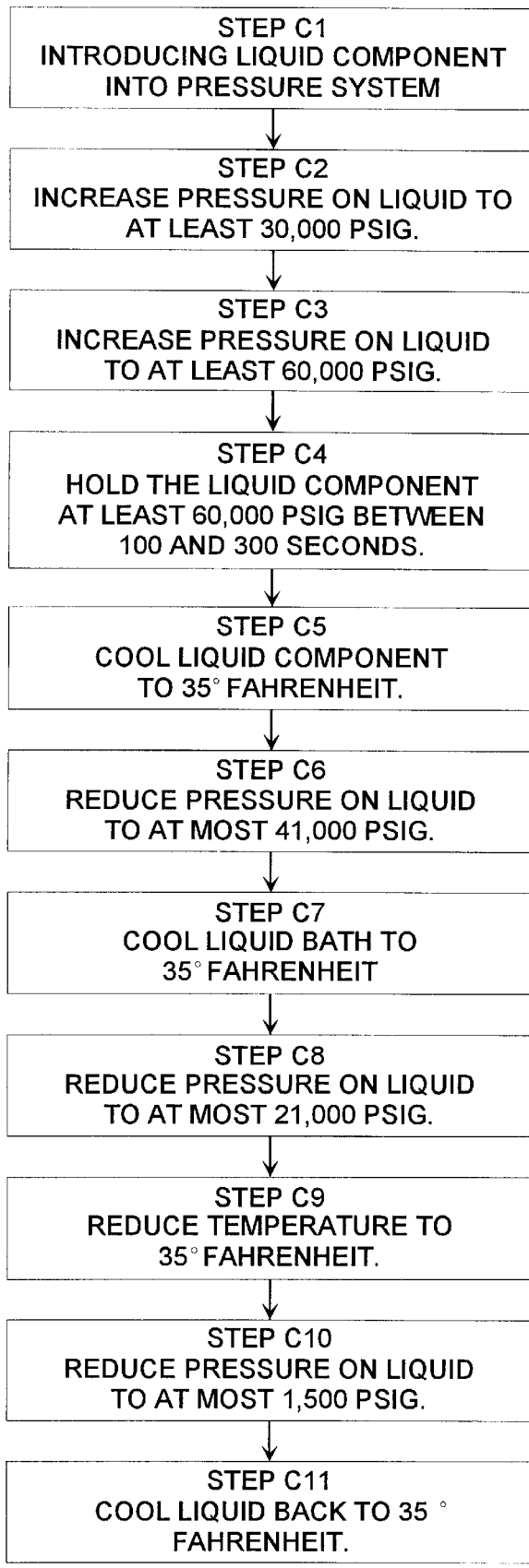
FIG. 2 is a block flow diagram of the supercritical pressure liquid treatment process.

FIG. 2 illustrates step C of FIG. 1, in which the liquid is treated in a continuous (as opposed to batch) process. Step C1 in this process involves introducing the liquid component into a continuous system for the pressurization and depressurization of the liquid component. Next, in step C2, the liquid reaches a first stage in the system whereby the pressure on the liquid increases to a first pressure, which may be about 30,000 psig, as the liquid flows through the system. In step C3, the liquid reaches a second stage in the system whereby the pressure on the liquid increases to a second pressure, which may be about 60,000 psig, as the liquid flows through the system. Pressurizing the liquid component in two stages facilitates continuous treatment. However, it should be understood that pressure could be increased at a single stage without departing from the intended scope herein. In step C4, the liquid component is processed at the second pressure for a time sufficient to affect a desired microbial kill level (for example, between about 100 and 300 seconds). At this pressure, the original volume of liquid component is reduced.

In steps C5–C12 the liquid is introduced into a third stage in the system whereby volume of the liquid is increased while the pressure on the liquid is reduced to a third pressure, such as atmospheric pressure. In a particular embodiment, the pressure reduction occurs through a series of steps to keep the liquid within a desired temperature range, so as to minimize temperature-induced off-tastes. Exemplary steps are illustrated in C5–C12. It should be understood, however, that more or less (including only one) of these steps may be used without departing from the intended scope herein.

In step C5 the pressurized liquid in the system is cooled to about 35 degrees Fahrenheit. Step C6 involves reducing pressure on the liquid to about 41,000 psig, for example, by a reverse Joule-Thompson effect, whereby as the pressure in the system reduces and the liquid expands, the temperature in the liquid increases. Therefore, as the pressure on the liquid is reduced, the temperature of the liquid in the system increases, for example, to about 85 degrees Fahrenheit for a change from about 60,000 to about 41,000 psig. Step C7 involves cooling the liquid again back to 35 degrees Fahrenheit. In step C8, the pressure of the liquid is again reduced, for example, to about 21,000 psig. Again, this causes the temperature of the liquid to increase. Step C9 involves cooling the liquid back to 35 degrees Fahrenheit. In step C10, the pressure of the liquid is again reduced to about 1,500 psig. Step C11 involves again cooling the liquid, for example, to 35 degrees Fahrenheit. Finally, in step C12, the pressure of the liquid is again reduced, this time to atmospheric pressure. In step C12 the liquid component is then sent to a liquid component and particulate component mixer, if a particulate component is provided.

The temperatures, pressures, and times illustrated in the above example, and below, may be changed, depending on the desired costs, temperature sensitivity of the liquid, and other considerations.

Figure 3:
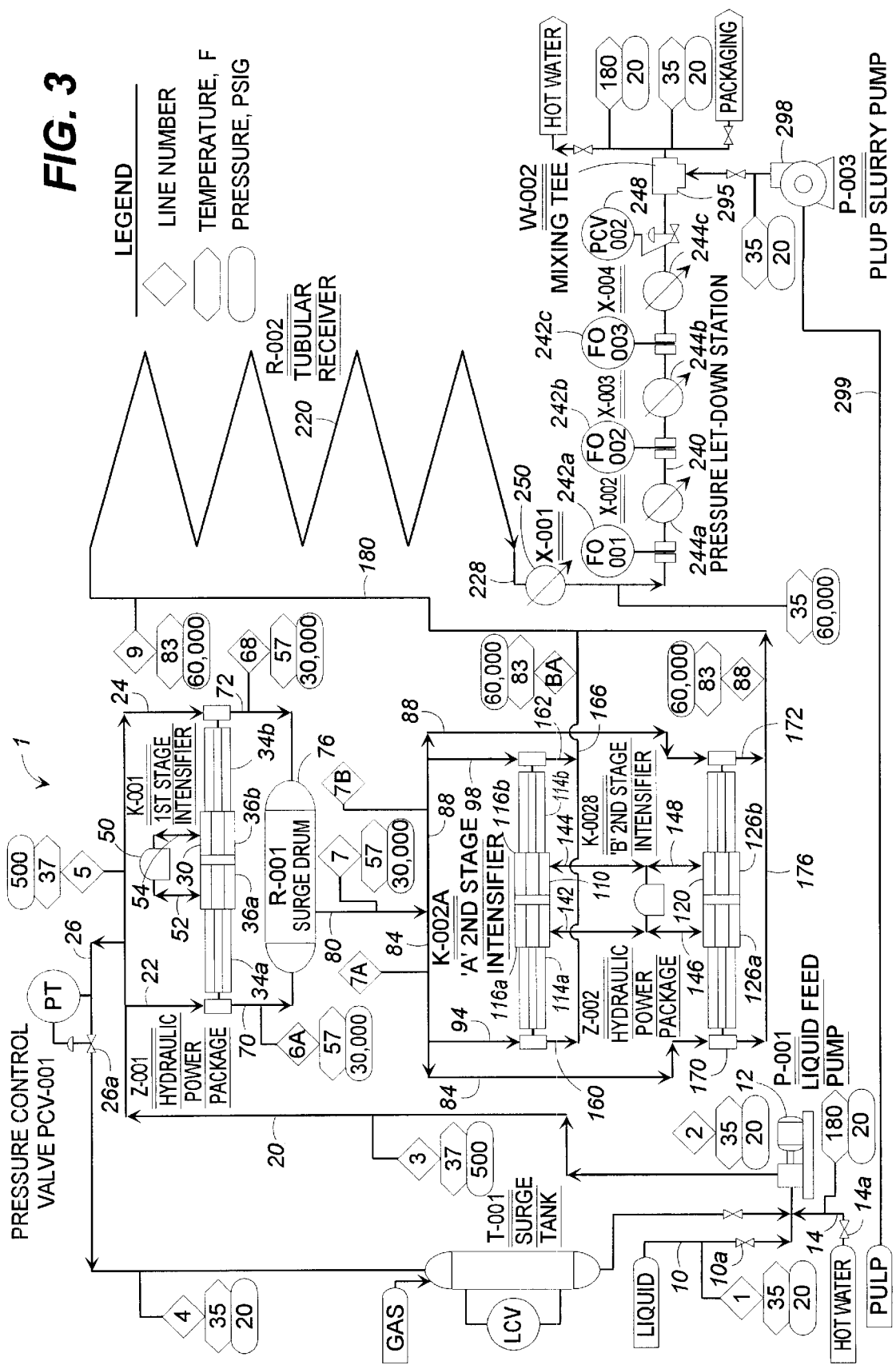
FIG. 3 is a schematic diagram of the liquid supercritical pressure treatment apparatus.

To fully treat the liquid component material in the process described above, there is provided in FIG. 3 a supercritical liquid treatment apparatus 1. More particularly, FIG. 3 shows a liquid component feed line 10 having a block valve 10a. Liquid component feed line 10 connects to a liquid feed pump 12 whereby the liquid component feeds into liquid feed pump 12 at a temperature of 35 degrees Fahrenheit and a pressure of 20 psig. In addition, connected to line 10 is hot water line 14 containing valve 14a located between line 10 and hot water tank 16. During the treatment of the liquid component, valve 14a on hot water line 14 is closed. Liquid feed pump 12 increases the pressure of the liquid component to 500 psig and temperature to 37 degrees Fahrenheit and pumps the liquid component into line 20. Line 20 splits into three separate lines 22, 24 and 26 wherein lines 22 and 24 feed into intensifier 30 while line 26 is a release (or surge) line.

The first intensifier comprises a first cylinder 34a and a second cylinder 34b connected to hydraulic power chambers 36a and 36b respectively. Plungers 38a and 38b are disposed within cylinders 34a and 34b respectively. Hydraulic power package 50 is connected to cylinders 34a and 34b via lines 52 and 54 respectively. Lines 52 and 54 allow hydraulic fluid to flow from power chambers 36a and 36b to hydraulic power package 50 and then back again. Power package 50 controls the movement of plungers 38a and 38b within cylinders 34a and 34b by the flow of hydraulic fluid through valves 56 and 58 located within power pack 50. The pressure of the hydraulic fluid in lines 52 and 54 is between about 1,800 psig and about 3,000 psig.

For example, pack 50 drives plungers 38a and 38b from point B to point A by simultaneously drawing hydraulic fluid from power chamber 36b and driving hydraulic fluid into power chamber 36a. As hydraulic fluid enters power chamber 36a, it drives plunger 38a through its compression stroke from point B to point A. Accordingly, as hydraulic fluid leaves power chamber 36b, plunger 38b is drawn from point B to point A and is in its suction stroke. When plungers 38a and 38b reach point A, valves 56 and 58 in power package 50 reverse themselves causing plungers 38a and 38b to reverse direction and move towards position B whereby plunger 38a is now in a suction stroke and plunger 38b is in a compression stroke.

To fill the cylinders of intensifier 30 the liquid component is pressurized at 500 psig so it can serve as a positive feed into the cylinders of the intensifier 30 when the plungers in their cylinder are in their suction stroke. For example, the pressurized liquid in process line 22 feeds into first cylinder 34a when plunger 38a is in a suction stroke. In addition, pressurized liquid in process line 24 feeds into cylinder 34b when plunger 38b is in a suction stroke.

To maintain a constant pressure in first intensifier 30, there is provided a release line 26 connected to process line 20 before intensifier 30. Along release line 26 is pressure control valve 26a. Pressure control valve 26a is designed so that when pressure inside intensifier 30 exceeds certain pressure, such as about 30,000 psig, pressure control valve 26a will open, allowing additional liquid to flow down release line 26 and eventually into surge tank 40. The level of the liquid in surge tank 40 will vary, and an inert ballast gas (e.g., nitrogen) is provided in tank 40 via gas tank 42 which is connected to surge tank 40 through line 44. The liquid inside surge tank 40 may be recycled through the system and back into pump 10 through recycling line 46.

The movement of these plungers in the cylinder through their compression stroke increase the pressure of the liquid in the system to about 30,000 psig. Plungers 38a and 38b, upon movement through the compression stroke, force the pressurized liquid, in cylinders 34a and 34b through lines 70 and 72 respectively, and into surge drum 76. The pressure on the liquid when it enters surge drum 76 is about 30,000 psig, and the increase in pressure on this liquid is also accompanied by an increase in temperature, to about 57 degrees Fahrenheit at about 30,000 psig.

The liquid in surge drum 76 serves as a pressurized feed into flow line 80. Flow line 80 then splits into lines 84 and 88. Both lines 84 and 88 split such that line 84 now continues parallel to line 94, and line 88 continues parallel to line 98. All four lines feed into a second stage intensifier unit comprising a first intensifier 110 and a second intensifier 120 connected in parallel with each other. For example, lines 94 and 98 connect to intensifier 110 and lines 84 and 88, running parallel to lines 94 and 98 respectively, connect to intensifier 120.

While the present embodiment of the invention discloses a second stage intensifier unit that comprises two intensifiers 110 and 120 connected in parallel with each, other embodiments, for example a single intensifier, may be used without departing from the intended scope herein. This parallel design is created to more efficiently handle capacities greater than 50 gpm and pressures greater than 2750 bar. Furthermore, although the preferred embodiment discussed herein includes two intensifier stages (intensifier, 30 and second stage intensifier unit (110 and 120)), one pressure increase stage may also be used, for example with a single intensifier or single intensifier unit of parallel intensifiers.

Intensifier 110 comprises cylinders 114a and 114b for housing plungers 118a and 118b while intensifier 120 comprises cylinders 124a and 124b for housing plungers 128a and 128b. Similar to first stage intensifier 30, the plungers in second stage intensifiers 110 and 120 move reciprocal to each other within their respective cylinders. In addition, plunger movement in intensifiers 110 and 120 are controlled by hydraulic power pack 130.

For example, the liquid that flows into second stage intensifier 110 leaves surge drum 76, flows through lines 80, then through lines 84 and 88 until lines 84 and 88 join lines 94 and 98. The fluid flows into lines 94 and 98 and alternately enters cylinders 114a, and 114b, when plungers 118a and 118b are in their suction stroke. Plunger 118a is in its suction stroke when plungers 118a and 118b move from position A to position B within cylinders 114a and 114b. Accordingly, plunger 118b is in its compression stroke. When plungers 118a and 118b move back from position B to position A plunger 114b is now in its suction stroke while plunger 114a is in its compression stroke.

For the liquid that flows into second stage intensifier 120, the pressurized liquid leaves surge drum 76, through line 80, next flows into lines 84 and 88, and enters cylinders 124a, and 124b when plungers 128a and 128b are in their suction stroke. Plunger 128a is in its suction stroke when plungers 128a and 128b move from position A to position B within cylinders 124a and 124b. Accordingly, plunger 128b is in its compression stroke. When plungers 128a and 128b move back from position B to position A, plunger 128b is now in its suction stroke while plunger 128a is in its compression stroke.

Hydraulic power pack 130 controls the flow of the plungers inside second stage intensifiers 110 and 120. Lines 142 and 144 connect hydraulic power pack 130 to power chambers 116a and 116b, while lines 146 and 148 connect hydraulic power pack 130 to power chambers 126a and 126b. The pressure of the hydraulic fluid in lines 142, 144, 146 and 148 is between about 1,800 psig and about 3,000 psig. As disclosed above, hydraulic power pack 130 controls the movement of the plungers in the cylinders such that when a compression stroke is completed, valves 132 and 134 in hydraulic power pack 130, are reversed causing the intensifier plungers to move in the opposite direction.

Second stage intensifiers 110 and 120 increase the pressure of the liquid to about 60,000 psig. This increase in pressure will also result in the liquid increasing in temperature to approximately 83 degrees Fahrenheit.

Plungers 118a and 118b alternately force the discharge of the compressed liquid through lines 160 and 162 during their compression stroke. Similarly, plungers 128a and 128b alternately force the compressed liquid through lines 170 and 172 during the compression stroke of plungers 128a and 128b. Lines 160 and 162 then meet and form line 166 while lines 170 and 172 meet and form line 176. Lines 166 and 176 then join line 180.

Figure 4:
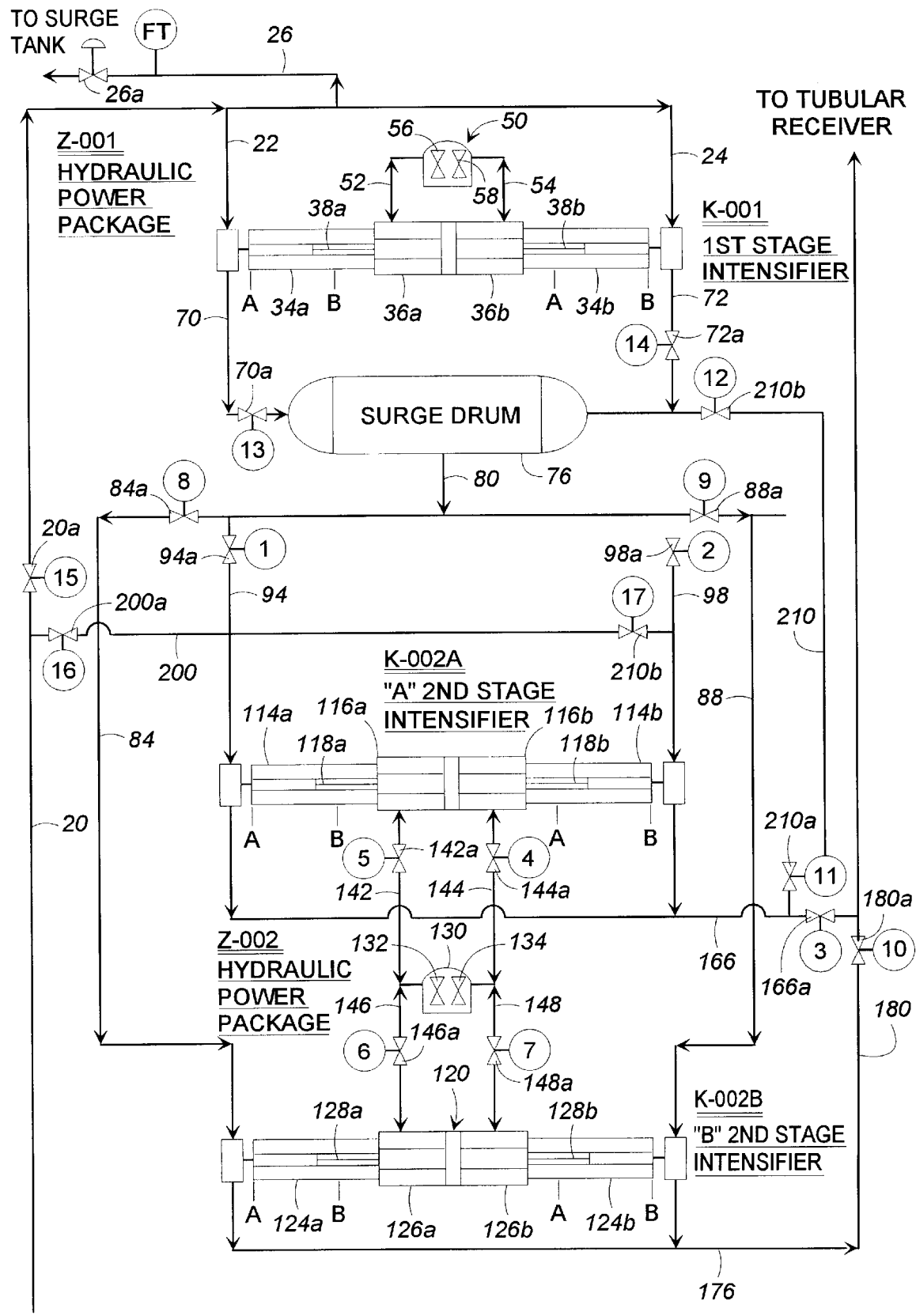
FIG. 4 is a schematic diagram of the supplemental maintenance control system.

The system may require periodic maintenance, therefore, an additional embodiment of the invention is shown in FIG. 4 whereby the liquid component treatment system is provided with a supplemental maintenance control system. This system is similar to the system described in FIG. 3 however, this system contains an additional series of lines and block valves. For example, the system contains an additional line 200 which connects to line 20 before valve 20a on line 20. Line 200 extends from line 20 and connects to lines 94 and 98. Line 200 contains valves 200a and 200b with valve 200a located between line 20 and line 94 and valve 200b located between line 94 and line 98. In addition the system is provided with a Line 210 which connects to surge drum 76 and extends to line 166. Line 210 contains valves 210a and 210b.

This system also contains an additional series of block valves. For example, lines 70 and 72 contain valves 70a and 72a respectively. Lines 84 and 94 contain valves 84a and 94a located on their respective lines after line 94 separates from line 84. Similarly, lines 88 and 98 contain valves 88a and 98a located on their respective lines after line 98 separates from line 88. Lines 142, 144, 146 and 148 contain valves 142a, 144a, 146a, and 148a respectively. Line 166 contains valve 166a between line 210 and line 180. Line 180 contains valve 180a between line 176 and line 166.

These additional lines and valves can be opened or closed to allow a series of repairs to intensifiers 30, 110 and 120. During normal operating conditions, valves 200a, 200b on line 200, and 210a and 210b on line 210 are closed while all other valves are open. However, when it is necessary to repair intensifier 110, valves 94a and 98a are closed preventing the liquid component from flowing through lines 94 and 98 and into intensifier 110. In addition, valves 142a and 144a on lines 142 and 144 are closed preventing hydraulic fluid from flowing from intensifier 130 into hydraulic chambers 116a and 116b. The closure of these valves then frees intensifier 110 to be repaired while the system is still running.

When repairs to intensifier 120 are necessary, valves 84a and 88a are closed, preventing the liquid component from flowing through lines 84 and 88 and into intensifier 120. In addition, valves 146a and 148a are closed on lines 146 and 148 preventing hydraulic fluid from flowing from intensifier 130 into hydraulic chambers 126a and 126b. The closure of these valves then leaves intensifier 120 free to be repaired while the system is still running.

When it is necessary to repair intensifier 30, valve 20a is closed and valves 200a and 200b are opened to allow fluid into line 200 of the system. The fluid then feeds alternatively into lines 94 and 98 and then into cylinders 114a and 114b of intensifier 110 during their suction stroke. The pressurized liquid flows into lines 160 and 162 and then flows into line 166. Line 166 joins line 210 whereby when valves 210a and 210b on line 210 are open and valve 166a on line 166 is closed, the fluid flows into surge drum 76. Valves 70a and 72a are closed to prevent flow of the liquid component from surge drum 76 into lines 70 and 72. The fluid in surge drum 76 then serves as a pressurized feed into intensifier 120. This is because valves 94a and 98a on lines 94 and 98 are closed preventing the fluid from flowing into intensifier 110. This situation then leaves intensifier 30 free to be repaired while the system is still running.

Once the liquid component is pressurized, for example to about 60,000 psig by intensifiers 110 and 120, it is fed through lines 166 and 176 into line 180. Line 180 then meets tubular receiver 220. Inside tubular receiver 220, the liquid is maintained at the elevated pressure where a portion of the microorganisms are killed by being maintained under a high pressure for a sufficient period of time (e.g. about 100 to about 500 seconds). To keep this treatment process continuous, the flow of the liquid is continuous through the tubular receiver. The length of the tubular receiver will depend on, among other things, flow rates, dimensions, and the amount of the time needed for the desired kill level. The times provided herein may be lengthened, or shortened, depending on, among other things, initial microbial levels and desired kill levels.

Figure 5:
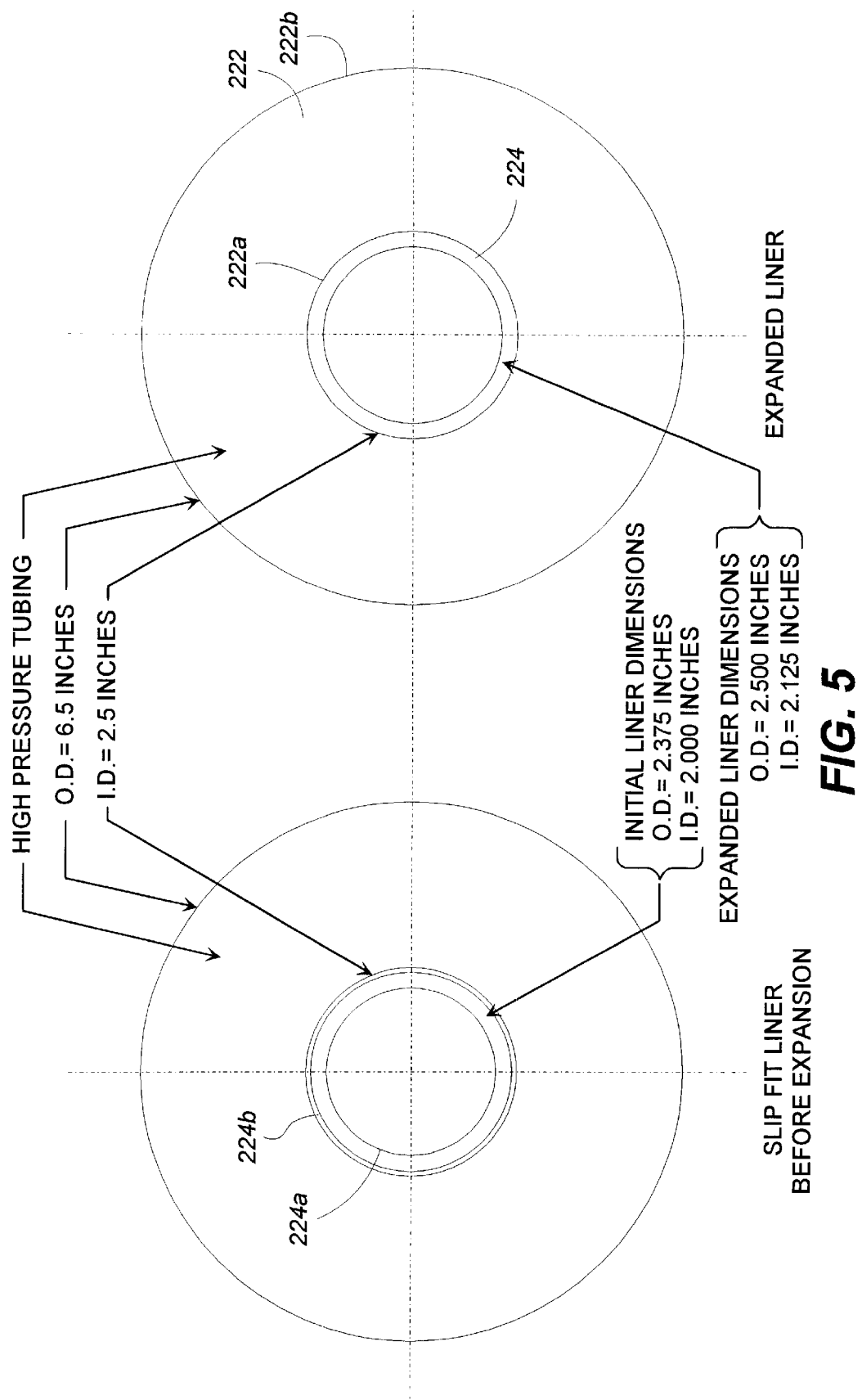
FIG. 5 is a schematic cross sectional view of stainless steel lined high pressure tubing.

As shown in FIG. 5, receiver 220 can be of autoclave or tubular design, and will be of a compound construction with an outer pressure tubing 222 and a thin wall liner of corrosion resistant stainless steel 224. Outer pressure tubing 222 comprises ASTM standard 4340 steel with an inner bore face 222a having a diameter about 2.5 inches and outer face 222b having a diameter measuring about 6.5 inches, however any composition of pressure tubing meeting the strength requirements may be used.

Inner liner 224 may consist of Type 304 stainless steel tubing having inner bore surface 224a having a diameter measuring approximately 2.0 inches, and outer surface 224b having a diameter measuring 2.375 inches. Inner liner 224 will be slipped inside of inner bore 222a of outer pressure tubing 222 and will be hydraulically expanded via an autofrettage process to tight fit to the 2.5 inch inside diameter of bore 222a. The purpose of the stainless steel liner is to provide corrosion resistance against the PH of the liquid being treated and to be compatible with the requirements of food processing.

Figure 6:
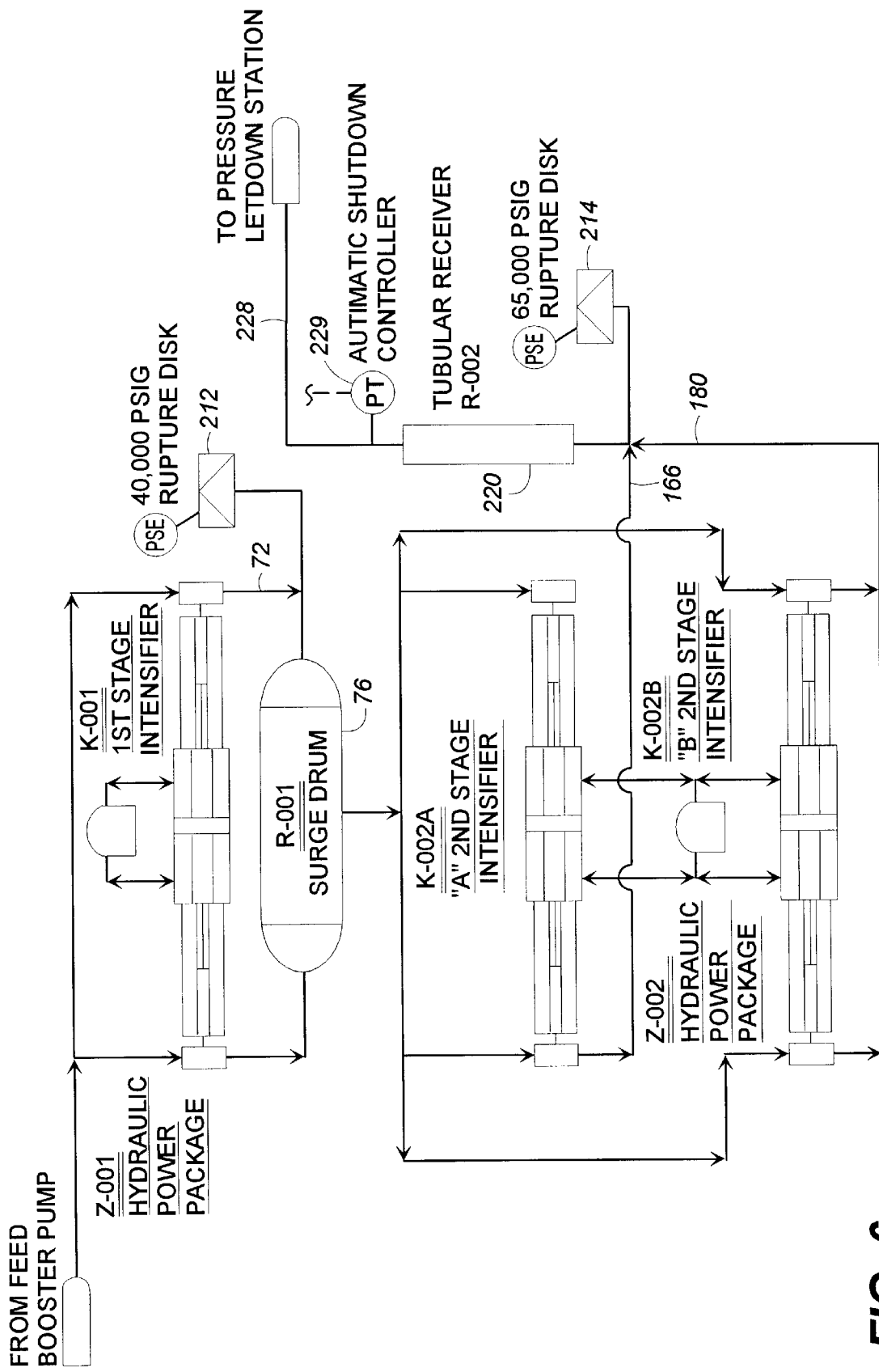
FIG. 6 illustrates the intensifier system pressure relief system.

The system may also be provided with safety mechanisms to prevent the rupture or tear of any of the lines or components within the system, therefore an additional embodiment of the invention is shown in FIG. 6. FIG. 6 discloses a rupture disk 212 attached to line 72 before line 72 connects to surge drum 76. Rupture disk 212 is set to rupture at about 40,000 psig and thereby warning any operator of the system that the pressure of the liquid component in line 72 or surge tank 76 has exceeded about 40,000 psig. In addition, another rupture disk 214 is connected to line 180 as line 166 joins line 180. Rupture disk 214 is set to rupture at about 65,000 psig and thereby warning any operator of the system that the pressure of the liquid component in line 180 has exceeded about 65,000 psig. Line 180 then connects to tubular receiver 220. On the other side of tubular receiver 220, is line 228 connected thereto. Connected to line 228 is automatic shutdown controller 229 which shuts the system down if the pressure in the system breaks either rupture disk.

Figure 7:
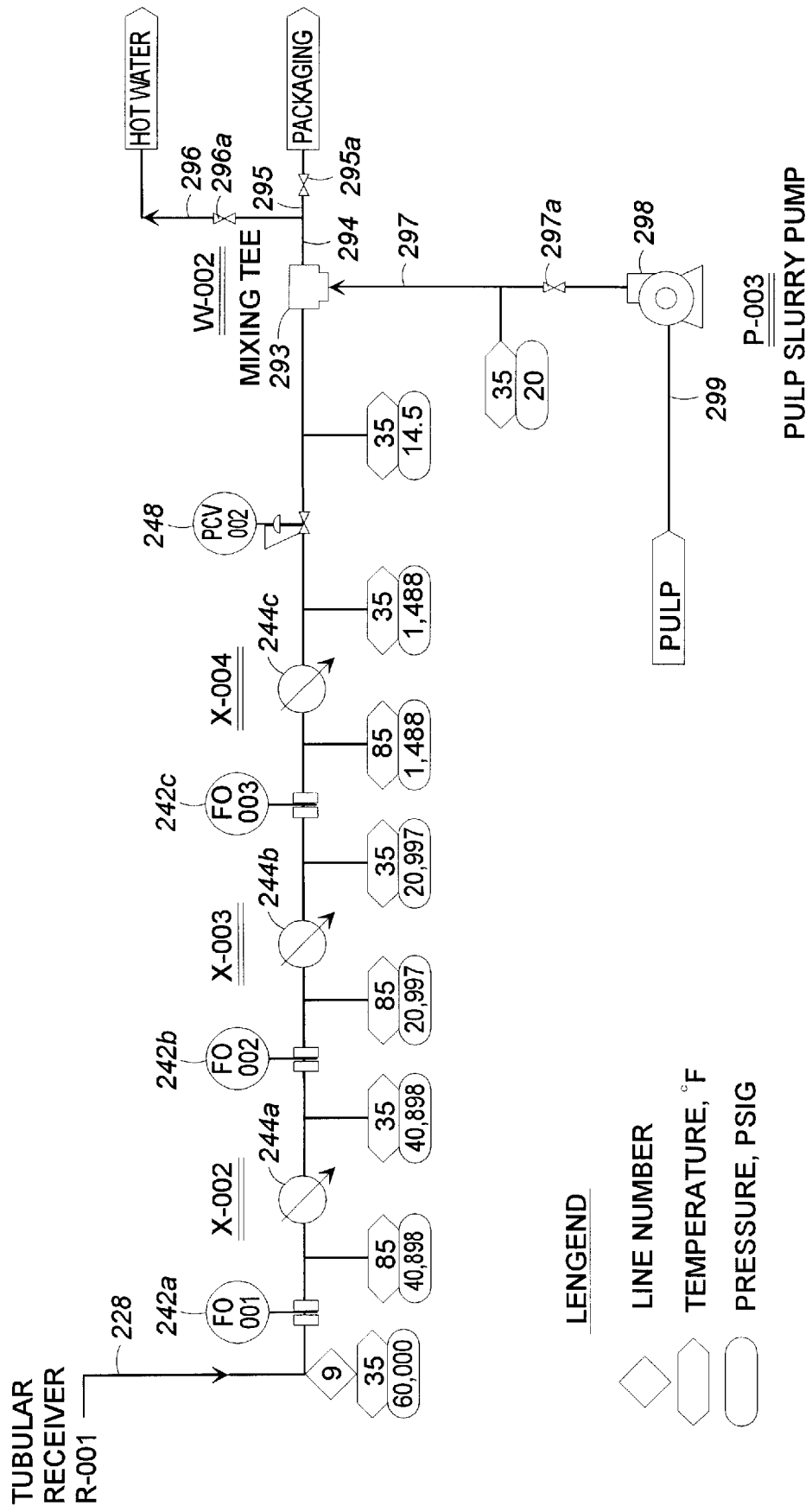
FIG. 7 is a schematic view of the pressure let down station.

As shown in FIG. 3 Line 228 connects to heat exchanger 250. This heat exchanger reduces the temperature of the pressurized liquid from about 83 degrees Fahrenheit to about 35 degrees Fahrenheit. In addition, connected to line 228 is pressure let down station 240 as shown in FIG. 7. Pressure let-down station 240 actually consists of an alternating series of pressure let-down controllers 242a, 242b, 242c each in an alternating series with heat exchangers 244a, 244b, and 244c followed by pressure control valve 248 which combine to reduce the pressure in the liquid to atmospheric pressure by a series of steps while keeping the temperature of the liquid component at or below about 85 degrees Fahrenheit. Line 228 links the pressure let down controllers to the heat exchangers in this series.

Figure 8:
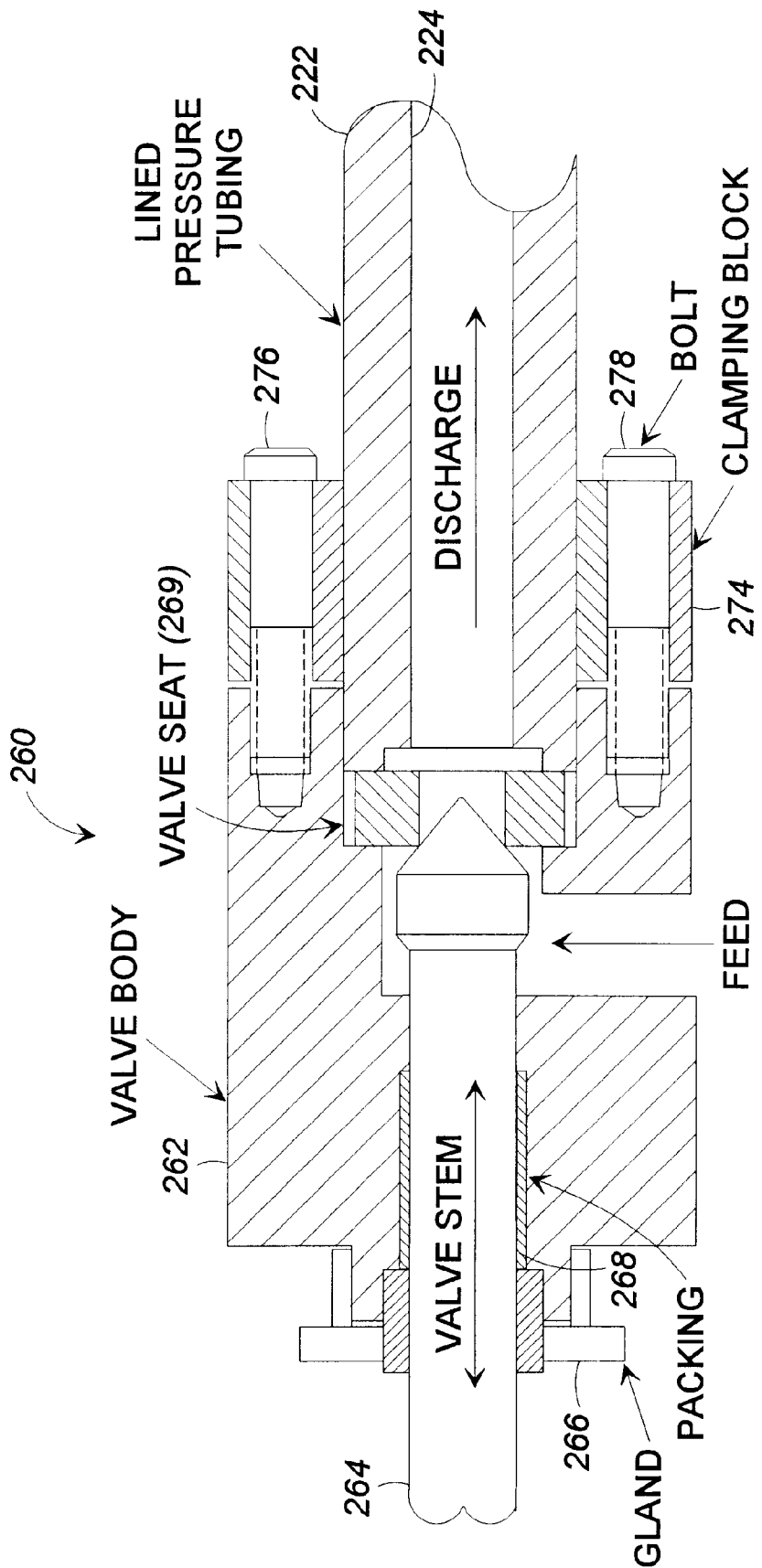
FIG. 8 is a is a cross sectional drawing of the design for a controllable high pressure high velocity pressure/flow control valve.
Figure 9:
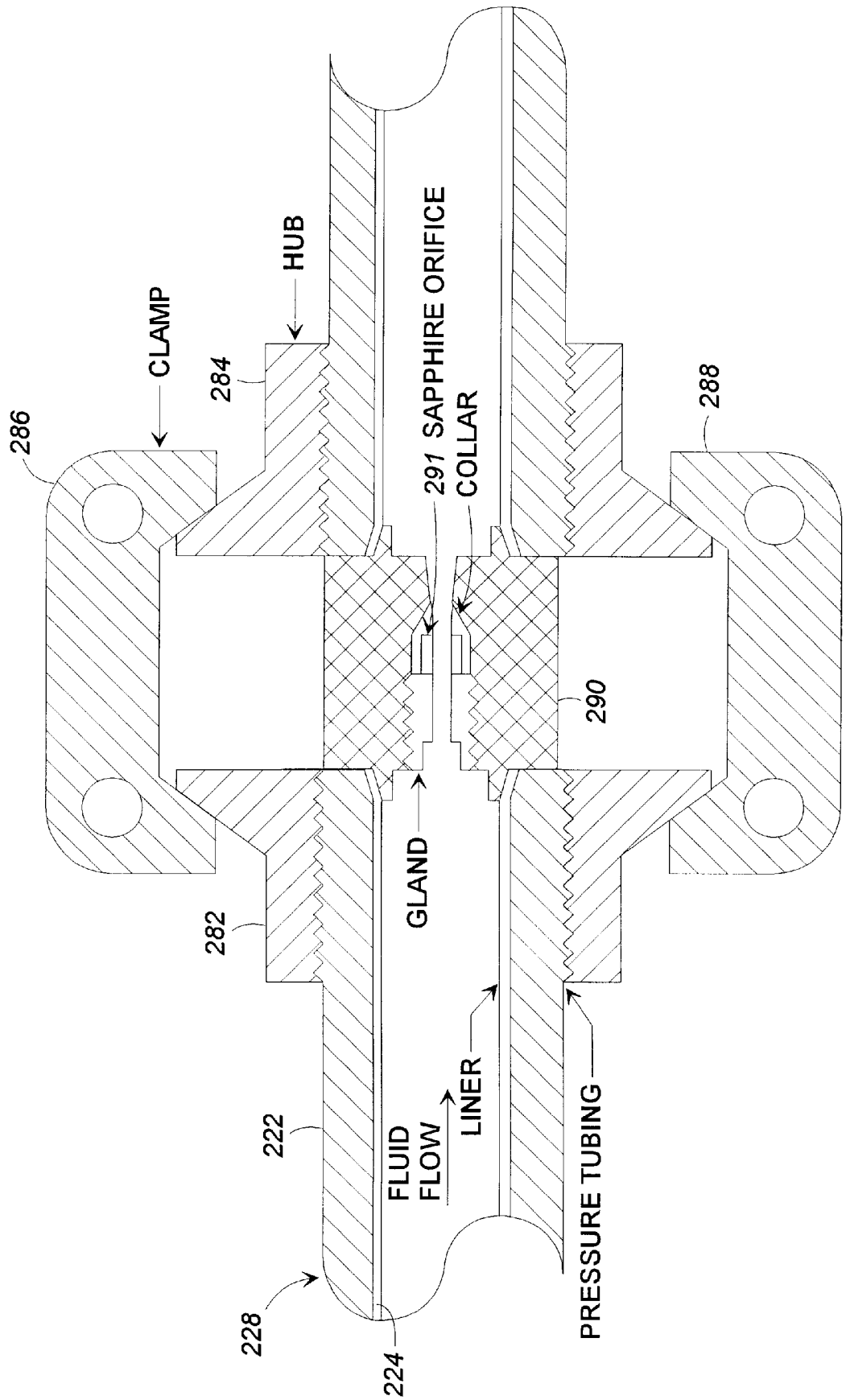
FIG. 9 is a cross-sectional view of orifice pressure/flow control system.

Pressure let down controllers 242a, 242b, and 242c each comprise a pressure control valve 260 (FIG. 8) or a flow control orifice 280 (FIG. 9). FIG. 8 shows that pressure control valve 260 is comprised of a valve body 262, with valve stem 264 housed within the valve body 262. Valve stem 264 is secured within valve body 262 by gland 266 and valve stem 264 is supported inside valve body 262 by packing 268.

Valve seat 269 rests against valve stem 264 inside valve body 262. The lines in the system are made up of pressure tubing 222 and liner 224 which rests against valve seat 269 inside valve body 262. Pressure tubing 222 and liner 224 are secured within valve body 262 by clamping block 274 and bolts 276 and 278 which secure clamping block 274 to valve body 262.

FIG. 9 shows the cross sectional view of flow control orifice 280 which is spliced between two sections of pressure tubing 222 and liner 224 which ultimately form line 228. Flow control orifice comprises two hubs 282 and 284 which are threaded around pressure tubing 222. Clamps 286 and 288 clamp hubs 282 and 284 together and force both ends of pressure tubing line 228 into collar 290. Collar 290 supports sapphire orifice 291 and gland 292 which is threaded into collar 290 after sapphire orifice 291. The minimum diameter of this flow control orifice 280 is about 0.2 inches which is large enough to pass any particulate what may be flushed out during a clean-in-place washing of the process equipment.

The design of the orifice controller and the downstream tubing is such that at the discharge of the orifices, eddies are created downstream of the orifice with the eddies assisting in the absorption of the kinetic energy of the jet stream.

Maintenance or replacement of an orifice may be required from time to time. Therefore, the installation of double block valves may be provided within the system just prior to the pressure let down station to periodically replace certain sections of the system without reducing the pressure in the system. It is important to maintain a constant pressure in this system to avoid a cycling of the system which may result in a shorter life of the components.

Figure 10:
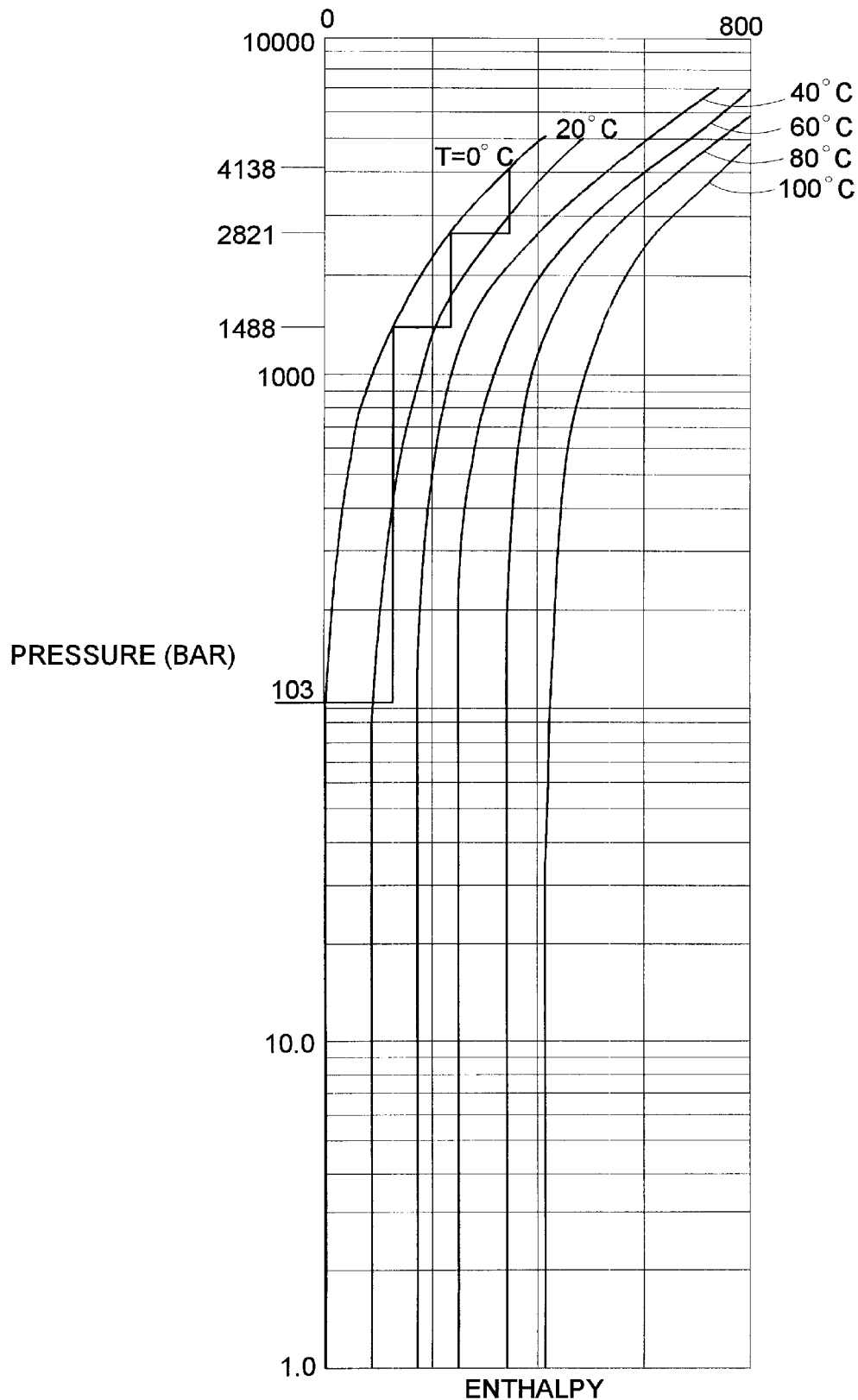
FIG. 10 illustrates the thermodynamics of the pressure let down station.
Figure 11:
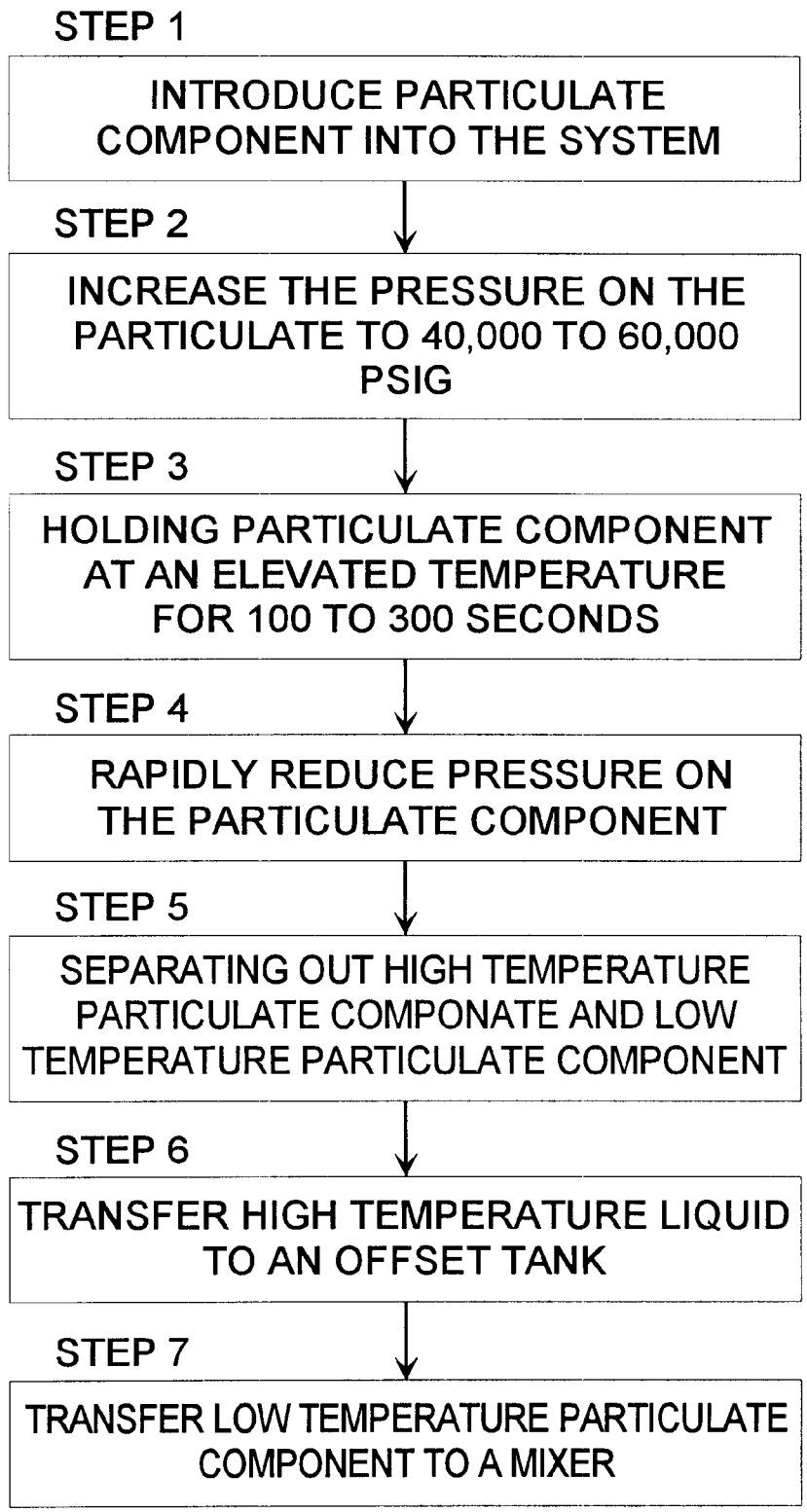
FIG. 11 is a block flow diagram showing the particulate treatment process.

While the liquid component is compressed in tubular receiver 220, the pressure in the system reduces the liquid component to about 87.5% of its original volume. When the liquid component reaches the pressure let down stage, it is expanded to its original volume through a series of steps. In this case, the expansion of the liquid occurs through a reverse Joule-Thompson effect, whereby the liquid will heat up during each pressure let down step. To maintain the quality of the liquid (e.g. orange juice) in the apparatus, the heat exchanger following each pressure relief valve will keep the temperature of the liquid below about 85 degrees Fahrenheit. Thermodynamically, the expansion across each pressure let-down controller is shown in FIG. 10.

For example, the cooled liquid component enters pressure let down controller 242*a* with a temperature of about 35 degrees Fahrenheit and a pressure of about 60,000 psig. Pressure let down controller simultaneously decreases the pressure of the liquid to about 41,000 while increasing the temperature to about 85 degrees Fahrenheit. The liquid then enters heat exchanger 244*a* where it is cooled back to a temperature of about 35 degrees Fahrenheit. The liquid then enters pressure let down controllers 242*b*. Pressure let down valve simultaneously decreases the pressure of the liquid to about 21,000 while increasing the temperature of the liquid to about 85 degrees Fahrenheit. Heat exchanger 244*b* then cools the liquid back to about 35 degrees Fahrenheit. Next, the liquid enters pressure let down controller 242*c* where the pressure is further reduced to about 1,500 psig while the liquid again heats up to about 85 degrees Fahrenheit. Heat exchanger 244*c* cools the liquid back to about 35 degrees Fahrenheit. While the first three pressure reductions work under the reverse Joule Thompson Effect the last pressure reduction does not. Accordingly, when the liquid enters pressure control valve 248 the pressure is reduced to about 14.5 psig without any noticeable temperature increase. The flow rates across pressure let down controllers 242*a,* 242*b,* and 242*c* are about 2,000 ft/sec, about 1,500 ft/sec, and about 1,000 ft/sec respectively. These flow rates across the pressure let down controllers are sufficient to cause the remaining microorganisms within the liquid component to fracture and thereby facilitate the sterilization of the liquid component.

The liquid component then moves down line 228 and into mixing tee 293 (FIG. 7). Mixing tee 293 connects to line 294 which then splits into lines 295 and 296 having valves 295*a* and 296*a* respectively. In addition, mixing tee 293 connects to pulp slurry line 297. Pulp slurry line 297 has valve 297*a* and connects to pulp slurry pump 298. Pulp slurry pump 298 is fed by pulp slurry line 299. Therefore, the liquid component mixes with the particulate component in mixing tee 297 and then flows to packaging down line 294 and then down line 296.

In following with the standards of the industry, the high pressure liquid treatment system may be periodically flushed, with a solvent (e.g. hot water) to remove the build-up of any particulate or coatings of components by the liquid food. The solvent can be an acid wash but it should be chemically compatible with the equipment. To avoid unnecessary cycling in the system, the operating pressures within the system are maintained while the fluid feed in the system is changed over from the liquid component of liquid food to a solvent. Therefore, to flush the system of particulates, valve 10*a* on line 10 (FIG. 2) is closed while valve 14*a* on line 14 is opened. This step stops the flow of the liquid component into the system, and allows a solvent or in this case, hot water to feed into the system. Hot water feeds into the system at 180 degrees Fahrenheit and 20 psig into line 14 from hot water tank 16. Using standard or above standard operating pressures, the hot water is pumped through the system to free particulates from the system. The water flows through the system by the same process as described above for the liquid component of the untreated liquid food. Liquid component treatment system 1 has a volume of approximately 400 gallons. To completely flush the system of particulates, it is necessary to flush up to eight volumes of hot water through the system before normal activities can resume. To avoid having hot water contaminate the packaging system, valves 295*a* and 297 on line 295 and 297 respectively are closed while valve 296*a* on line 296 is opened to allow the hot water treatment to flow through the system and down line 296 instead of line 295. The system may be flushed with hot water once every 24 hours and then returned back to treating the liquid component of the liquid food.

Sterilizing the Particulate Component

FIG. 11 discloses the batch process for sterilizing the particulate component of the liquid food as shown in step D of FIG. 1. Although this batch process is described in connection with the particulate component, the liquid component can also be treated with this batch process, alone or in combination with the previously described continuous process.

Step D1 involves introducing the particulate component into a pressurized system. In Step D2, the pressure on particulate component in the system is increased to about 40,000 psig to about 60,000 psig whereby the temperature of the particulate component in the system will increase by approximately 20 degrees Fahrenheit. Next, step D3 involves holding the particulate component at a constant pressure for a proscribed period of time (e.g. about 100 to about 300 seconds) which will sterilize the particulate component by killing off microorganisms in the particulate component. Step D4 involves rapidly reducing the pressure on the particulate component to atmospheric pressure. During this rapid pressure reduction step, a portion of the liquid particulate component may reach temperatures as high as about 240 degrees Fahrenheit and maintain an average temperature of about 125 degrees Fahrenheit thus exceeding the desired temperature range for the product. Another portion of the particulate component will remain within the desired temperature range of about 35 to about 85 degrees Fahrenheit. Therefore, step D5 involves separating the high temperature particulate component from the low temperature component. In step D6 the high temperature liquid particulate component is transferred to an off site tank. Next, step D7 involves transferring the treated low temperature particulate component product to a liquid component and particulate component mixer.

To fully treat the particulate component in the process described above, the particulate component is sent to a particulate treatment system 300. This system may be comprised of a single receiver treatment system 310 in FIG. 12 or a double receiver treatment system 400 in FIG. 13. In either of these systems, the particulate component of the liquid is held at an elevated pressure of about 60,000 psig for a prescribed length of time (e.g. about 100 to about 300 seconds) to deactivate microorganisms that may be present in the particulate component.

FIG. 12 shows the single receiver system 310. This high pressure particulate system comprises a series of lines 312, 314, 316, 318, 320, 322 and 324 which connect feed tank 330, intensifier 340, bleed tank 350, product tank 360, and receiver 370 together and allow the particulate component to flow between them.

Line 312 which comprises valve 312*a* and temperature gauge 312*b* connects feed tank 330 to receiver 370. Line 314 which comprises valve 314*a* connects product tank 360 to line 312 between valve 312*a* and receiver 370. Vent line 316 extends from receiver 370 and contains pressure gauge 316*a,* valve 316*b,* and pressure control valve 316*c*. Nitrogen line 318 contains pressure control valve 318*a,* and valve 318*b* and connects to vent line between valve 316*b* and receiver 370. Line 320 which comprises temperature gauge 320*a,* pressure gauge 320*b* and valve 320*c,* connects intensifier 340 to line 316 between valve 316b and receiver 370. Line 322 includes valve 322a, temperature gauge 322b and valve 322c connects bleed tank 350 to vent line 316 between valve 316b and receiver 370. Line 324 connects to intensifier 340 to allow pressurizing liquid to flow into intensifier 340.

Included in this sterilizing system 310 is a system of blanketing gas which is used in all tanks to protect the particulate component from oxidation. Blanketing gas pressure can also be used as a motive force to assist the gravity flow of the particulate component from one tank to another. In the single receiver configuration 310 (FIG. 12), each vessel has a separate source of chemical grade nitrogen and a pressure vent valve. In the multi-receiver configuration 400 (FIG. 13), each tank and receiver has a dedicated nitrogen system for blanketing gas and gas assisted feed and product transfers.

For example, connected to feed tank 330 is feed line 332 having valve 332a and vent line 334 having pressure control valve 334a. Vent line 334 connects to nitrogen line 336 having pressure control valve 336a. Pressure control line 337 connects pressure control valve 334a on vent line 334 to pressure control valve 336a on nitrogen line 336. Also, connected to feed tank 330 is pressure gauge 338 and temperature gauge 339 for reading the pressure and temperature of the particulate matter in the feed tank.

Connected to bleed tank 350 is product line 352 having valve 352a and vent line 354 having pressure control valve 354a. Vent line 354 connects to nitrogen line 356 having pressure control valve 356a. Pressure control line 357 connects pressure valve 354a on vent line 354 to pressure control valve 356a on nitrogen line 356. Also connected to bleed tank 350 is pressure gauge 358 and temperature gauge 359 for reading the pressure and temperature in the bleed tank.

Connected to product tank 360 is product line 299 (FIG. 2) having valve 299a, and vent line 364, having pressure control valve 364a. Vent line 364 connects to nitrogen line 366 having pressure control valve 366a. Pressure control line 367 connects pressure control valve 364a on vent line 364 to pressure control valve 366a on nitrogen line 366. Also connected to product tank 360 is pressure gauge 368 and temperature gauge 369 for reading the pressure and temperature in the bleed tank.

Figure 12:
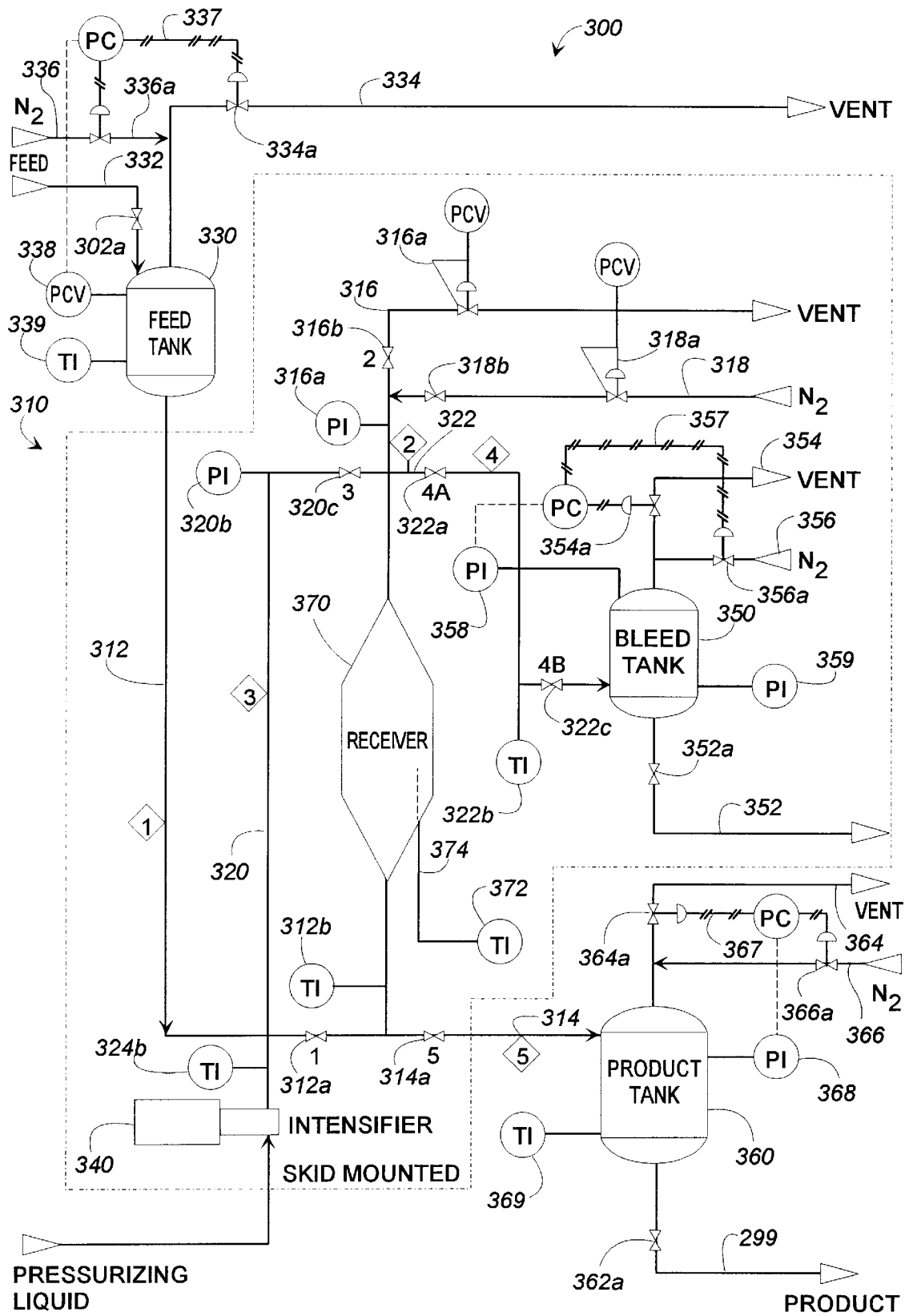
FIG. 12 is a schematic diagram of the single receiver configuration of the particulate treatment apparatus.
Figure 13:
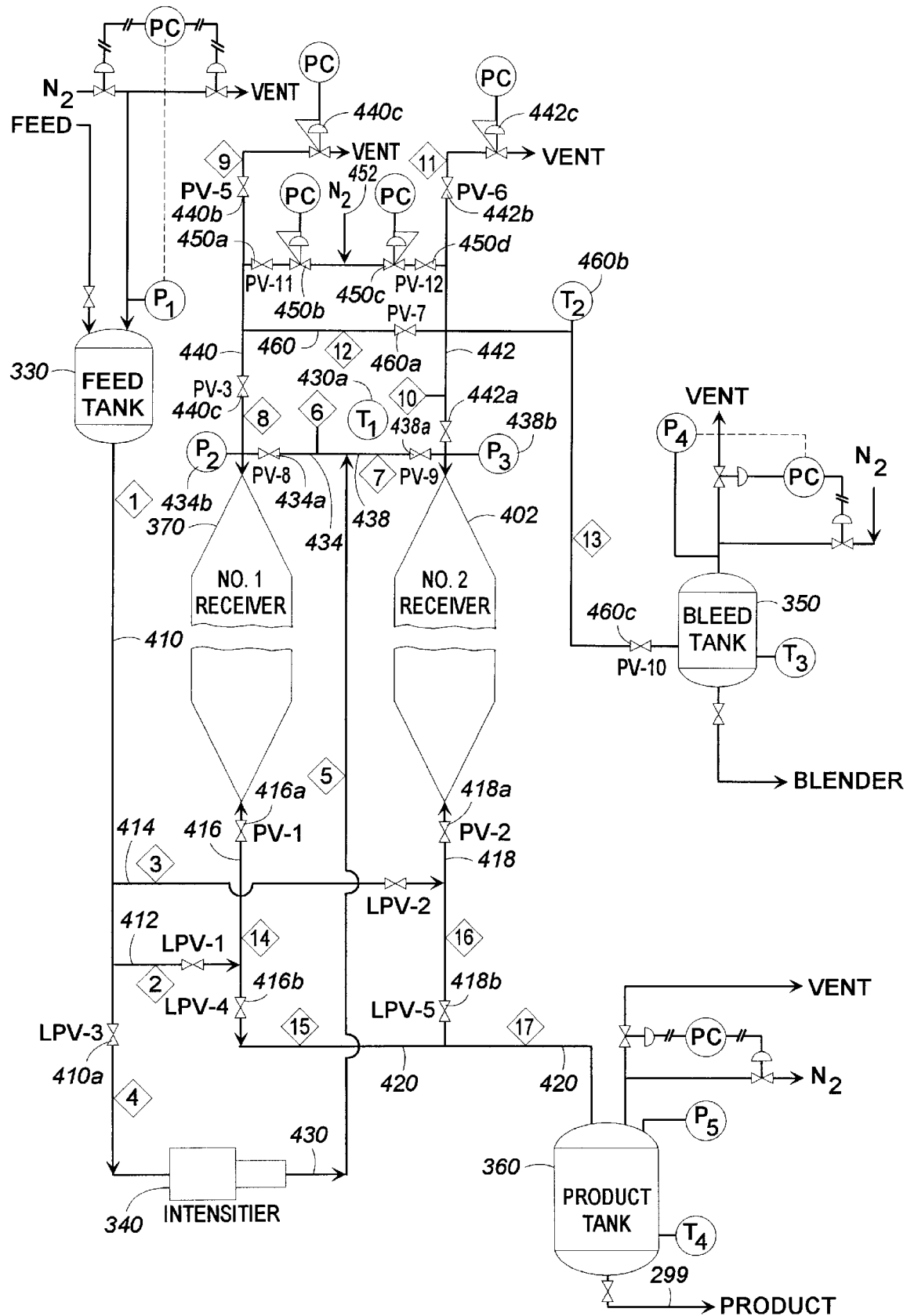
FIG. 13 is a schematic diagram of the multiple receiver configuration of the particulate supercritical pressure treatment apparatus.
Figure 14:
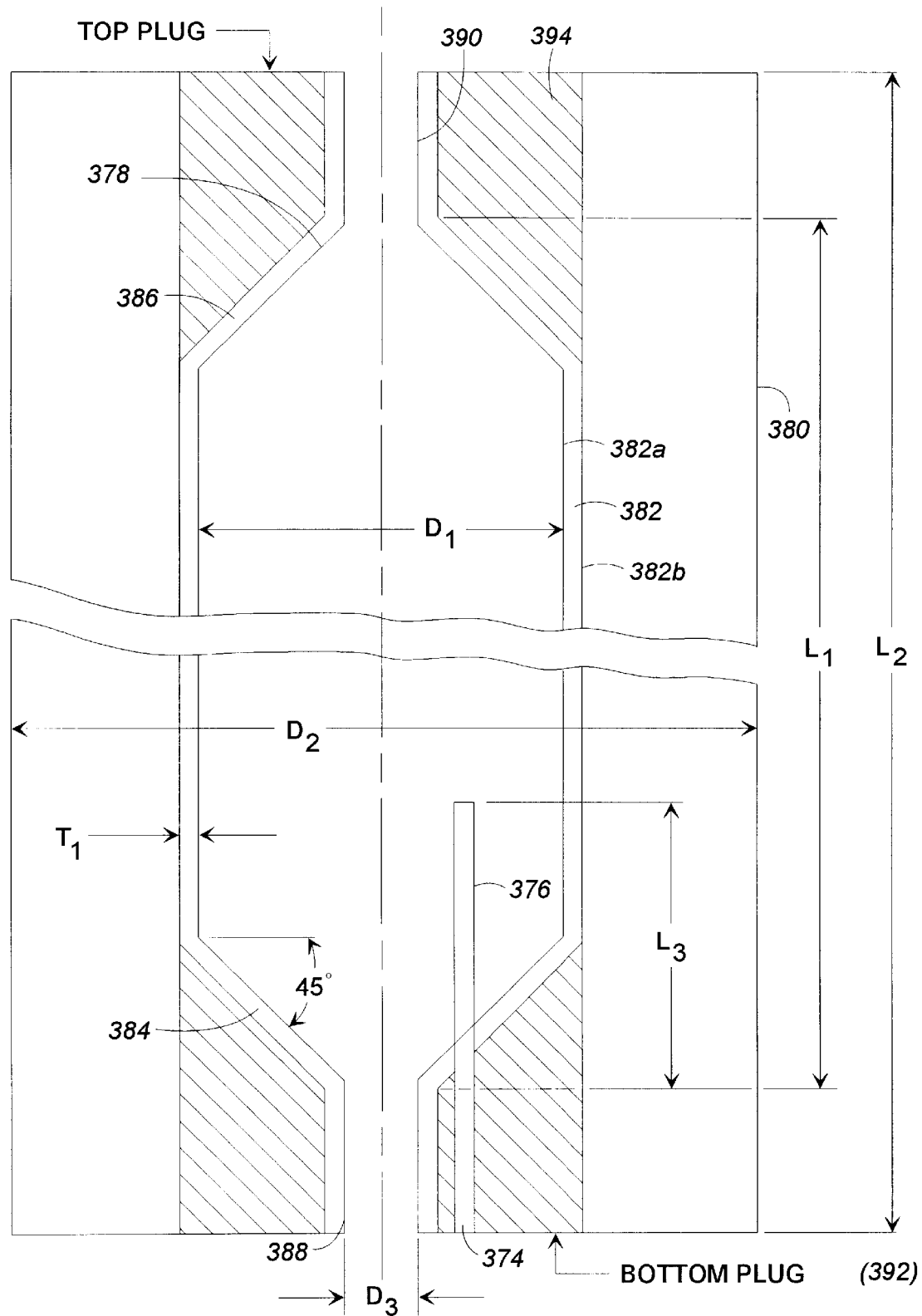
FIG. 14 is a cross sectional diagram illustrating the pulp treatment batch receiver.

Receiver 370 as shown in FIGS. 12 and 14 includes temperature control gauge 372, connected to thermocouple 374 which is housed within tubing 376. In addition, conductivity cell 378 is located within receiver 370 to detect whether receiver 370 has filled with particulate component. As shown in FIG. 14 a cross-sectional representation of receiver 370 shows the receiver itself comprises an outer casing 380, and an inner casing 382. Inner casing 382 has an inner wall 382a and an outer wall 382b. Inner casing 382 is substantially cylindrical in shape, but it angles in at a 45 degree angle at both a bottom end 384, and a top end 386. Both bottom end 384 and top end 386 taper to ducts 388 and 390 respectively. Bottom end 384 is supported within outer casing 380 by bottom plug 392. Top end 386 is supported within outer casing 380 by top plug 394.

To process the particulate component using the system 310, bulk untreated particulate component slurry is fed into elevated feed tank 330. The slurry has a concentration in the range of 40% to 60% and preferably about 50% particulate matter with the balance being an untreated liquid component. This concentration of approximately 50% pulp and 50% liquid facilitates reasonably rapid transfers of the slurry from tank to tank. Other less or more concentrated slurries of particulate matter can be used, with more concentrated particulate slurries requiring positive displacement. This mixture is fed through feed line 332 into feed tank 330. As feed tank 330 fills, nitrogen blanketing gas leaves feed tank 330, and vents through line 334. As the untreated mixture leaves feed tank 330, nitrogen blanketing gas is then fed back into feed tank 330 via nitrogen line 336.

The untreated mixture is fed by gravity flow out of feed tank 330 through line 312 and into a lower end of receiver 370, filling receiver 370 from the bottom up. To prevent any degradation of the particulate component, receiver 370 is filled with a blanketing gas (preferably nitrogen) that is displaced out of receiver 370 as the tank is filled with particulate matter. The displaced nitrogen gas from receiver 370 flows through line 316 to vent. When the receiver is completely full, as indicated by conductivity cell 378, or other suitable means, flow from the particulate component is stopped by closing valve 312a in line 312. Valves 316b in line 316, and 322a in line 322 are then closed. An untreated liquid component is introduced into the system via line 324. The untreated liquid is next pumped through intensifier 340 and placed into line 320. The liquid feeds into receiver 370 and the receiver is pressurized by intensifier 340 forcing the liquid component through the system. The system is then pressurized by intensifier 340 between about 40,000 and about 60,000 psig. When the intensifier discharge pressure and the receiver pressure reaches its target pressure the pressurization is discontinued, and valve 320c in line 320 is closed. During pressurization, the temperature of the particulate component in the receiver will increase slightly (e.g. by about 20 degrees Fahrenheit). The liquid in the filled and pressurized receiver is then allowed to stand, under pressure, for a prescribed residence time (e.g. about 100 to about 300 seconds) which will cause the deactivation of the microorganisms in the pressurized slurry of particulate and liquid component. After expiration of the prescribed residence time (e.g. up to about 300 seconds), valves 322a and 322c in line 322 are opened, allowing the pressure in receiver 370 to be vented to bleed tank 350. This vented liquid slurry, being the last used to pressurize the receiver, causes the pressure in the receiver to be rapidly reduced to essentially atmospheric pressure. The pressure drop is via isenthalpic expansion, causing the initial temperature of the vented fluid to reach temperatures as high as about 240 degrees Fahrenheit. The temperature of the vented liquid will gradually decrease as the pressure in the vented receiver decreases, dropping to about 50 degrees Fahrenheit at the end of the depressurization. However, the average temperature of the vented liquid stream is about 125 degrees Fahrenheit, exceeding its maximum allowed temperature. The liquid accumulated in bleed tank 350 having exceeded the maximum allowable temperature, is therefore designed as lower valued premium product and is transferred to an off-site tank for later use in a lesser valued product.

The treated particulate component slurry is discharged from receiver 370 to product tank 360 by opening valve 314a on line 314 and allowing fresh blanketing gas from nitrogen line 318 to displace the lost volume in receiver 370. The rate of transfer may be accelerated by increasing the pressure of the blanketing nitrogen gas. As the slurry flows into product tank 360, the displaced blanketing gas in product tank 360 vents to the atmosphere via vent line 364. Next, the particulate component flows down line 299 to mix with the liquid component (FIG. 3). No mixer is needed if the liquid component is treated with the batch process alone.

As an example of this process, using a 16"×81" receiver, five 700 lb batches of particulate component (e.g. pulp) each containing about 350 lb of both liquid food and particulate component can be deactivated per hour. The cycle time of about 12 minutes per batch includes the time for charging the receiver, pressurizing it, holding it for a prescribed residence time, venting the pressure and transferring the treated product to product tank 360. The transfer times may be altered by changing the viscosity of the particulate component or by using a nitrogen gas assist. Altering the viscosity can be done by an increase or a reduction of the liquid content of the particulate component.

Each 700 lb batch of particulate component slurry will process about 350 pounds of particulate component (e.g. pulp), which will produce about 3500 lb/hr, or about 401 gallon/hr of final brix 12 blended product. The above dimensioned single reactor configuration will produce about 1,750 lb. of particulate component/hour compared to a need for about 6,282 lbs/hr to process about 100 gpm of liquid component (e.g. juice). Thus, to meet the higher capacity liquid component treatment system, either the size of the receiver must be increased or additional receivers must be installed.

Multi-Receiver Configuration

The multi-receiver system 400 (FIG. 13) differs from the single receiver system in that the multi-receiver system contains an additional receiver 402 and a different set of lines connecting feed tank 330, intensifier 340, bleed tank 350, product tank 360 to first receiver 370, and second receiver 402. In the multi-receiver system, line 410 contains pressure valve 410*a* and connects feed tank 330 to intensifier 340. In addition, connected to line 410 are lines 412 and 414 which connect line 410 to receiver lines 416 and 418 respectively. Line 412 contains valve 412*a* while line 414 contains valve 414*a*. Receiver line 416 extends from receiver 370 to product line 420 and comprises valves 416*a* and 416*b* connected to receiver line 416 on either side of line 412. In addition, receiver line 418 extends from receiver 402 to product line 422 and contains valves 418*a* and 418*b* located on line 418 on either side of line 414. Product line 420 feeds into product line 422 wherein product line 422 then feeds into product tank 360.

Line 430 extends from intensifier 340 and contains temperature gauge 430*a*. Line 430 splits into two lines 434 and 438. Line 434 contains valve 434*a* and pressure gauge 434*b* and connects line 430 to receiver line 440. Line 438 contains valve 438*a* and pressure gauge 434*b* and connects line 430 to receiver line 442. Receiver line 440 and receiver line 442 connect to receiver 370 and receiver 380 respectively. Receiver line 440 contains first pressure valve 440*a*, second pressure valve 440*b*, and pressure control valve 440*c*. Receiver line 442 contains first pressure valve 442*a*, second pressure valve 442*b* and pressure control valve 442*c*. Line 450 connects receiver lines 440 and 442 and contains a first valve 450*a*, a first pressure control valve 450*b*, a second pressure control valve 450*c* and a second valve 450*d*. In addition, connected to line 450 between pressure control valve 450*b* and 450*c* is nitrogen input line 452.

Line 460 connects receiver lines 440 and 442 to bleed tank 350. Line 460 contains valve 460*a*, temperature gauge 460*b*, and valve 460*c*. Valve 460*a* is located between receiver lines 440 and 442, while temperature gauge 460*b* and valve 460*c* are located on line 460 between receiver line 442 and bleed tank 350. The dual receiver operation starts when the untreated particulate component leaves elevated feed tank 330 and travels down line 410 by gravity, through line 412, entering line 416 where it flows into first receiver 370. Valve 410*a* is closed preventing particulate component from entering intensifier 340. As the particulate component enters the bottom of receiver 370, nitrogen blanketing gas leaves receiver 370 and vents through line 440. When receiver 370 fills to the top, valves 412*a*, 416*a*, and 440*a* close. Once receiver 370 is full its pressure is increased with raw particulate component (e.g. pulp) from feed tank 330. Valve 410*a* opens and the raw particulate component flows from feed tank 330 though line 410 and into intensifier 340. Intensifier 340 pumps the particulate component into line 430, through line 434, and into receiver 370. During pressurization to the deactivation pressure, the temperature of the particulate component in receiver 370 will reach about 51 degrees Fahrenheit which is well within the preferred product temperature range of about 35 degrees Fahrenheit to about 85 degrees Fahrenheit. After receiver 370 reaches its target treatment pressure, the flow from intensifier 340 is stopped and valve 434*a* is closed to lock the particulate component in receiver 370 for a treatment time of 100 to 300 seconds at a pressure between about 40,000 to about 60,000 psig.

As the first receiver tank 370 sterilizes a batch, valve 410*a* closes but valve 414*a* opens to allow an additional batch to flow by gravity from feed tank 330 into line 414, next into line 418, flowing into the bottom of second receiver 402. As second receiver 402 fills with the particulate component, nitrogen blanketing gas leaves receiver 402 and vents through line 442. When receiver 402 fills to the top, valves 414*a*, 418*a* and 442*a* close. Once receiver 402 is full, its pressure is increased with raw particulate component (e.g. pulp) from feed tank 330. Valve 410*a* now opens allowing the raw particulate component from feed tank 330 to flow through line 410 and into intensifier 340. Intensifier 340 pumps the particulate component through line 430, into line 438 and then into the top of receiver 402. During pressurization to the deactivation pressure, the temperature of the particulate component in receiver 402 will reach approximately 51 degrees Fahrenheit which is well within the product temperature range of about 35 degrees Fahrenheit to about 85 degrees Fahrenheit. After receiver 402 reaches its target treatment pressure, the flow from intensifier 340 is stopped and valve 438*a* is closed to lock the particulate component in receiver 402 for a treatment time of about 100 to about 300 seconds at a pressure between about 40,000 and about 60,000 psig.

Once second receiver 402 is pressurized to the deactivation pressure, the procedure for discharging treated particulate component from receiver 370 is started. The pressure in receiver 370 is reduced from about 60,000 psig to atmospheric by venting the receiver pressure via lines 460 and 462 to bleed tank 350. This is achieved by opening valves 440*a,* and 460*a,* on lines 440, and 460 respectively. In the pressure let down stage, the temperature of the vented stream will reach 240 degrees Fahrenheit making it unsuitable for use as a premium blend stock. The temperature of the treated particulate component in receiver 370 as measured by the bottom mounted thermocouple settles at about 38 degrees Fahrenheit after depressurization. The treated particulate component in receiver 370 is also at about 38 degrees Fahrenheit. Next, valves 416*a* and 416*b* on line 416 now open and allow the treated particulate component to flow through lines 416, 420 and 422 to product tank 360 by gravity, or a possible blanketing gas (e.g. nitrogen) assist. During this transfer, receiver 370 is refilled with blanket gas (e.g. nitrogen). After emptying receiver 370, the system is ready for refilling again with raw untreated particulate component.

During the pressure treatment of the second batch particulate component in receiver 370, the cycle starts over again with the draining and refilling of receiver 402. As in the draining of receiver 370, the pressure in receiver 402 is reduced from about 60,000 psig to atmospheric by venting the receiver pressure via lines 442, and 460 to bleed tank 350. This is achieved by opening valve 442*a* in line 442. The temperature of the vented stream can reach about 240 degrees Fahrenheit making it unsuitable for premium blend stock. However, the temperature of the treated particulate component in receiver 402 remains at about 38 degrees Fahrenheit after depressurization. Next, valves 418*a* and 418*b* on line 418 open and allow this treated particulate component to flow through lines 418 and 422 to product tank 360 by gravity with a possible blanketing gas (e.g. nitrogen gas) assist.

Like the single receiver configuration, the multi-receiver configuration also utilizes a system blanketing gas (e.g. nitrogen) so that at no time are the vessels and piping exposed to atmospheric contamination or oxidizing atmospheres.

The dimensions and capacity of the receiver configurations can be varied with a change in internal diameter or length of the receiver and the tensile strength of the steel, as equipment or process costs dictate.

In another embodiment of the invention, the particulate component may be treated in a multi-receiver system using more than two receivers for processing. If two or more receiver vessels are used, then each receiver vessel is filled alternately such that as one receiver vessel is pressurized, the other receiver vessel is being depressurized and refilled with the next batch.

Figure 15:
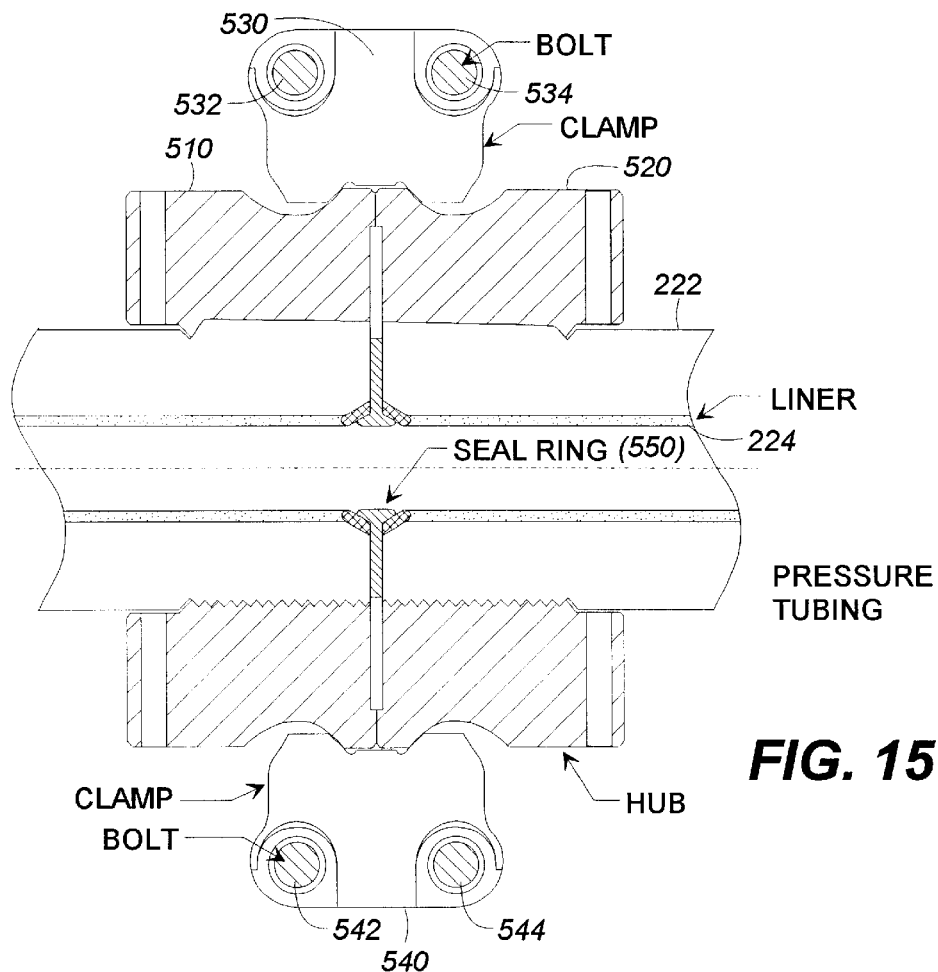
FIG. 15 is a cross sectional drawing of a Graylock coupling used to connect the lined high pressure process tubing.

The lines in the system are comprised of short segments of pressure tubing 222 to allow periodic replacement of the lines in the system, short segments of pressure tubing 222 are coupled together using a greylock coupling 500 as shown in FIG. 15. FIG. 15 shows a cross sectional view of greylock coupling 500 which comprises two hubs 510 and 520 coupled together by clamps 530 and 540 having bolts 532 and 534 on clamp 530 and bolts 542 and 544 on clamp 540. Hubs 510 and 520 thread onto each end of spliced pressure tubing 222. Seal ring 550 fits between the two spliced ends of pressure tubing 222 and inner liner 224. The two ends of pressure tubing 222 and liner 224 are joined together to form lines in the system by placing clamps 530 and 540 around hubs 510 and 520. Bolts 532 and 534 are tightened on clamp 530 to secure clamp 530 to hubs 510 and 520. Bolts 542 and 544 are tightened on clamp 540 to secure clamp 540 to hubs 510 and 520. The tightening of these bolts brings the two pieces of pressure tubing together to form a tight seal around seal ring 550. If it is necessary to remove a piece of pressure tubing from a line, then bolts 532 and 534 are loosened on clamp 530 and bolts 542 and 544 are loosened on clamp 540, allowing pressure tubing 222, which houses liner 224, to be removed from the line.

Figure 16:
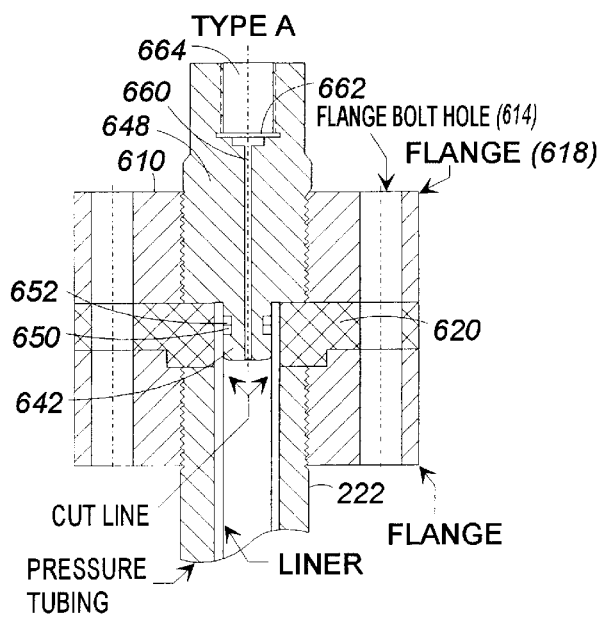
FIG. 16 is a cross sectional drawing of a first pressurization end plug for the treatment apparatus.
Figure 17:
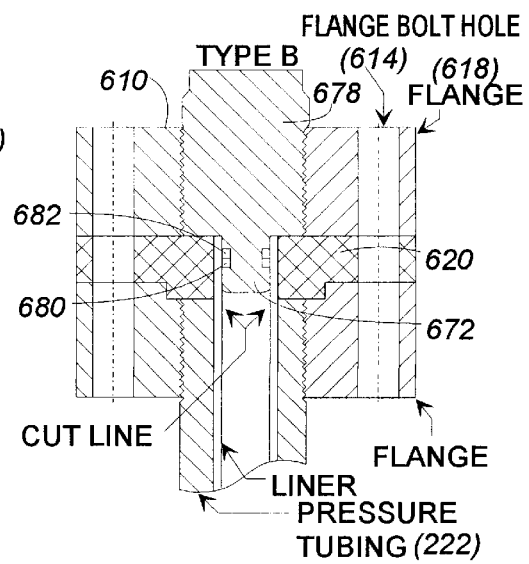
FIG. 17 is a cross sectional drawing of a second pressurization end plug for the treatment apparatus.

To close off a line, FIGS. 16 and 17 disclose a cross sectional view of pressurization end plugs having two different designs. In both designs there is a coupling 610 threaded around pressure tubing 222. Coupling 610 comprises a flange bolt hole 614 and a flange 618. An end portion of pressure tubing 222 is cut away to allow ring 620, housed within coupling 610 to contact inner liner 224.

In the first design, plug 640 (FIG. 16) has a stopper portion 642 and a threaded portion 648. Threaded portion 648 threads within coupling 610 and stopper portion 642 fits within inner liner 224. Notch 650 is cut within stopper portion 642 with notch 650 for housing ring 652. Plug 640 has a inner channel 660 which leads to pressure ring 662. Above pressure ring 662 is an open channel 664.

In the second design, plug 670 (FIG. 17) has a stopper portion 672 and a threaded portion 678. Threaded portion 678 threads within coupling 610 and stopper portion 672 fits within inner liner 224. Notch 680 is cut within stopper portion 672 with notch 680 for housing ring 682.

The liquid of this process may be, among other things; orange juice. The pressure vessels and the intensifier discharge lines should be fabricated from high pressure metal alloys such as 4340, 13-8PH, 15-5PH, and 17-48 PH precipitation hardened steels. The high pressure vessels and lines are lined with stainless steel to protect the quality of the product and to preclude corrosion by the pH of the liquid or particulate component. The low pressure tanks, transfer lines and valves are fabricated of stainless steel to protect the quality of the product and to preclude corrosion of the hardware.

Although the present invention has been described in detail, it should be understood that various modifications, alterations, and substitutions can be made to this description without departing from intended scope of the present invention as defined by the appended claims.

What is claimed is:

1. A process for sterilization of a liquid in a continuous system comprising:
  a) substantially continuously pumping the liquid through a pressurized system;
  b) increasing the pressure of the liquid at a plurality of pressurization stages;
  c) maintaining the liquid at an elevated pressure for a predetermined period of time;
  d) incrementally decompressing the liquid in a plurality of increments to fracture microorganisms within the liquid, the increments comprising:
    reducing the pressure in the liquid from about 60,000 psig to about 41,000 psig;
    reducing the pressure in the liquid from about 41,000 psig to about 21,000 psig;
    reducing the pressure in the liquid from about 21,000 psig to about 1,500 psig,
    reducing the pressure in the liquid from about 1,500 psig to about 15 psig; and
  e) maintaining the temperature of the liquid within a desired temperature range during the incrementally decompressing of the liquid.

2. The process of claim 1, wherein increasing the pressure comprises introducing the liquid into an intensifier.

3. The process of claim 1, wherein the liquid is maintained at the elevated pressure for at least 100 seconds.

4. The process of claim 1, wherein pressure is increased at two stages.

5. The process of claim 1 wherein incrementally depressurizing the liquid and maintaining the temperature of the liquid further comprises an alternating series of steps of:
  cooling the liquid to a desired temperature;
  depressurizing the liquid to a desired reduced pressure level;
  and repeating the cooling and depressurizing, steps to reach a desired level of reduced pressure in the liquid while maintaining the liquid in a desired temperature range.

6. An apparatus for the continuous sterilization of a liquid in a pressurized system comprising:
  a pump for continuously introducing the liquid into the pressurized system;
  a first stage intensifier coupled to the pump the first stage intensifier for increasing the pressure of the liquid in the system;
  a second stage intensifier coupled to the first stage intensifier, the second stage intensifier for receiving and increasing the pressure of the pressurized liquid in the system;
  a pressure receiver coupled to the second intensifier, the pressure receiver for receiving the pressurized liquid from the second stage intensifier and maintaining the pressurized liquid for a predetermined period of time;
  a pressure reducer coupled to the pressure receiver, said pressure reducer comprising a liquid temperature controller and a pressure controller wherein the pressure reducer reduces the pressure of the liquid in the pressurized system to a predetermined level while maintaining the liquid within a desired temperature range; and
  a surge tank coupled to the first stage intensifier for recycling a portion of the liquid component back to the first stage intensifier.

7. The apparatus of claim 6, wherein the pressure reducer comprises an alternating series of heat exchangers and pressure controllers.

8. The apparatus of claim 6, wherein said liquid temperature controller comprises a series of heat exchangers that maintain the temperature of the liquid between about 35 degrees Fahrenheit and about 85 degrees Fahrenheit.

9. The apparatus as in claim 6, further comprising a liquid component and particulate component separator connected to the liquid pump for separating particles from the liquid.

10. An apparatus for the continuous sterilization of a liquid in a pressurized system comprising:
- a pump for continuously introducing the liquid into the pressurized system;
- a first stage intensifier coupled to the pump, the first stage intensifier for increasing the pressure of the liquid in the system;
- a second stage intensifier coupled to the first stage intensifier, the second stage intensifier for receiving and increasing the pressure of the pressurized liquid in the system,
- a pressure receiver coupled to the second intensifier, the pressure receiver for receiving the pressurized liquid from the second stage intensifier and maintaining the pressurized liquid for a predetermined period of time;
- a pressure reducer coupled to the pressure receiver, said pressure reducer comprising a liquid temperature controller and a pressure controller, wherein the pressure reducer reduces the pressure of the liquid in the pressurized system to a predetermined level while maintaining said liquid within an acceptable temperature range, comprising a particulate treatment apparatus coupled to the separator, the treatment apparatus comprising: and
- a liquid component and particulate component separator connected to the liquid pump for separating particles from the liquid;
- a pressure treatment receiver vessel for sterilizing particulate slurry;
- an intensifier coupled to the receiver vessel for increasing the pressure on the particulate slurry;
- a recoverer for collecting the treated particulate slurry; and
- a blender for blending the treated particulate slurry with the treated liquid matter.

11. The apparatus as in claim 10, wherein there are at least two pressure treatment receiver vessels for sterilizing the particulate slurry, the vessels connected to the liquid component and particulate slurry separator.

12. A process for sterilization of a liquid in a continuous system comprising:
a) substantially continuously pumping the liquid through a pressurized system;
b) increasing the pressure of the liquid at a plurality of pressurization stages;
c) maintaining the liquid at an elevated pressure for a predetermined period of time;
d) depressurizing the liquid to fracture microorganisms within the liquid;
e) separating the liquid from a particulate slurry;
f) treating the particulate, slurry in a pressurized system by:
  i) increasing the pressure on the particulate slurry; and
  ii) returning the particulate slurry to substantially atmospheric pressure; and
g) blending the particulate slurry with the liquid slurry.

13. The process of claim 12 wherein in step i) the particulate slurry is treated in a plurality of receiver vessels.

14. An apparatus for the continuous sterilization of a liquid in a pressurized system comprising:
- a pump for continuously introducing the liquid into the pressurized system;
- a first stage intensifier coupled to the pump, the first stage intensifier for increasing the pressure of the liquid in the system;
- a second stage intensifier coupled to the first stage intensifier, the second stage intensifier for receiving and increasing the pressure of the pressurized liquid in the system;
- a pressure receiver coupled to the second intensifier, the pressure receiver for receiving the pressurized liquid from the second stage intensifier and maintaining the pressurized liquid for a predetermined period of time;
- a pressure reducer coupled to the pressure receiver wherein the pressure reducer reduces the pressure of the liquid in the pressurized system to a predetermined level;
- a liquid component and particulate component separator connected to the liquid pump for separating particles from the liquid;
- a particulate treatment apparatus coupled to the separator, the treatment apparatus comprising:
  - a pressure treatment receiver vessel for sterilizing particulate slurry;
  - an intensifier coupled to the receiver vessel for increasing the pressure on the particulate slurry;
  - a recoverer for collecting the treated particulate slurry; and
  - a blender for blending the treated particulate slurry with the treated liquid matter.

15. The apparatus as in claim 14, wherein there are at least two pressure treatment receiver vessels for sterilizing the particulate slurry, the vessels connected to the liquid component and particulate slurry separator.

16. A process for sterilization of a liquid in a continuous system comprising:
a) substantially continuously pumping the liquid through a pressurized system;
b) increasing the pressure of the liquid at a plurality of pressurization stages;
c) maintaining the liquid at an elevated pressure for a predetermined period of time;
d) incrementally decompressing the liquid in a plurality of increments to fracture microorganisms within the liquid;
e) maintaining the temperature of the liquid within a desired temperature range during the incrementally decompressing the liquid;
f) separating the liquid from a particulate component; and
g) treating the particulate component in a pressurized system by:
  i) increasing the pressure on the particulate component; and
  ii) returning the particulate matter to substantially atmospheric pressure; and
h) blending the particulate component with the liquid component.

17. The process of claim 16 wherein in step i) the particulate component is treated in a plurality of receiver vessels.

18. The process of claim 16, wherein the step of returning the particulate matter to substantially atmospheric pressure comprises incrementally decompressing the particulate matter in a plurality of increments to fracture microorganisms within the particulate component and maintaining the temperature of the particulate component within a desired temperature range during the incrementally decompressing of the particulate component.

* * * * *